US011699167B2

(12) United States Patent
Montero

(10) Patent No.: US 11,699,167 B2
(45) Date of Patent: Jul. 11, 2023

(54) SYSTEMS AND METHODS FOR INTELLIGENT PROMOTION DESIGN WITH PROMOTION SELECTION

(71) Applicant: Maplebear Inc., San Francisco, CA (US)

(72) Inventor: Michael Montero, Palo Alto, CA (US)

(73) Assignee: MAPLEBEAR INC., San Francisco, CA (US)

( * ) Notice: Subject to any disclaimer, the term of this patent is extended or adjusted under 35 U.S.C. 154(b) by 0 days.

(21) Appl. No.: 17/665,504

(22) Filed: Feb. 5, 2022

(65) Prior Publication Data
US 2022/0230201 A1    Jul. 21, 2022

Related U.S. Application Data

(63) Continuation of application No. 17/234,698, filed on Apr. 19, 2021, now abandoned, which is a (Continued)

(51) Int. Cl.
*G06Q 30/0242* (2023.01)
*G06Q 30/0251* (2023.01)
(Continued)

(52) U.S. Cl.
CPC ..... *G06Q 30/0244* (2013.01); *G06Q 30/0201* (2013.01); *G06Q 30/0239* (2013.01);
(Continued)

(58) Field of Classification Search
CPC ........... G06Q 30/0244; G06Q 30/0201; G06Q 30/0239; G06Q 30/0271; G06Q 30/0241; G06F 17/10
(Continued)

(56) References Cited

U.S. PATENT DOCUMENTS 6,084,583 A    7/2000 Gerszberg et al.
6,577,982 B1   6/2003 Erb
(Continued)

FOREIGN PATENT DOCUMENTS

WO    WO 9407239         3/1994
WO    WO 2013/055634 A1  4/2013
(Continued)

OTHER PUBLICATIONS

Ilya Katsov, Predictive analytics for promotion and price optimization, 2018 (Year: 2018).*
(Continued)

*Primary Examiner* — Tarek Elchanti
(74) *Attorney, Agent, or Firm* — Fenwick & West LLP

(57) ABSTRACT

Systems and methods for the selection of the promotions are provided. A set of possible offers are initially received, each including a set of variables, with each variable having a set of possible values. These form a combination of variable values for each offer. A heuristic is applied to all possible offers to reduce the number of offers being considered. The combination of variable values for these reduced number offers is converted into a vector value, which is then scored, ranked and the top ranked offers are selected for inclusion in a promotional campaign. The remaining offers are then analyzed to select additional offers to include into the promotional campaign which maximizing a determinant for the selected offers using their vectors. All selected offers are administer in a promotional test campaign across many consumer segments. Feedback from the campaign may be collected to generate a "general" offer.

16 Claims, 24 Drawing Sheets

Related U.S. Application Data continuation of application No. 15/597,138, filed on May 16, 2017, now Pat. No. 10,984,441, which is a continuation-in-part of application No. 14/209,851, filed on Mar. 13, 2014, now Pat. No. 9,984,387.

(60) Provisional application No. 61/780,630, filed on Mar. 13, 2013.

(51) Int. Cl.
  *G06Q 30/0201* (2023.01)
  *G06Q 30/0207* (2023.01)
  *G06F 17/10* (2006.01)
  *G06Q 30/0241* (2023.01)

(52) U.S. Cl.
  CPC .......... *G06Q 30/0271* (2013.01); *G06F 17/10* (2013.01); *G06Q 30/0241* (2013.01)

(58) Field of Classification Search
  USPC ...................................................... 705/14.43
  See application file for complete search history.

(56) References Cited

U.S. PATENT DOCUMENTS

| | | |
|---|---|---|
| 7,092,436 B2 | 8/2006 | Ma et al. |
| 7,152,040 B1 | 12/2006 | Hawthorne et al. |
| 7,158,959 B1 | 1/2007 | Chickering et al. |
| 7,200,527 B1 | 4/2007 | Davidov et al. |
| 7,254,547 B1 | 8/2007 | Beck et al. |
| 7,360,698 B1 | 4/2008 | Wyker |
| 7,376,603 B1 | 5/2008 | Mayr et al. |
| 7,379,890 B2 | 5/2008 | Myr et al. |
| 7,406,434 B1 | 7/2008 | Chang et al. |
| 7,639,727 B1 | 12/2009 | Brisebois et al. |
| 7,660,734 B1 | 2/2010 | Neal et al. |
| 7,912,748 B1 | 3/2011 | Rosenberg et al. |
| 7,996,331 B1 | 8/2011 | Solanki et al. |
| 8,140,381 B1 | 3/2012 | Wu et al. |
| 8,140,402 B1 | 3/2012 | Mesaros |
| 8,606,626 B1 | 12/2013 | DeSoto et al. |
| 8,676,632 B1 | 3/2014 | Watson et al. |
| 8,972,391 B1 | 3/2015 | McDonnell et al. |
| 9,418,341 B1 | 8/2016 | Kadarkarai |
| 9,639,842 B1 | 5/2017 | Green et al. |
| 9,947,022 B1 | 4/2018 | Shariff et al. |
| 10,255,620 B1 | 4/2019 | Koren et al. |
| 10,497,018 B1 | 12/2019 | Sullivan et al. |
| 10,580,035 B2 | 3/2020 | Mehanian et al. |
| 2001/0014868 A1 | 8/2001 | Herz et al. |
| 2001/0018665 A1 | 8/2001 | Sullivan et al. |
| 2002/0007329 A1 | 1/2002 | Alcaly et al. |
| 2002/0010620 A1 | 1/2002 | Kowalchuk et al. |
| 2002/0023117 A1 | 2/2002 | Bernardin et al. |
| 2002/0026351 A1 | 2/2002 | Coleman |
| 2002/0087453 A1 | 7/2002 | Nicolaisen et al. |
| 2002/0123930 A1 | 9/2002 | Boyd et al. |
| 2002/0147639 A1 | 10/2002 | Williams et al. |
| 2002/0161641 A1 | 10/2002 | Quinlan et al. |
| 2002/0165834 A1 | 11/2002 | Delurgio et al. |
| 2002/0169700 A1 | 11/2002 | Huffman et al. |
| 2002/0184086 A1 | 12/2002 | Linde |
| 2002/0194051 A1 | 12/2002 | Hall et al. |
| 2003/0110074 A1 | 6/2003 | Vives |
| 2003/0130580 A1 | 7/2003 | Kenyon |
| 2003/0130883 A1 | 7/2003 | Schroeder et al. |
| 2003/0149938 A1 | 8/2003 | McElfresh et al. |
| 2003/0204437 A1 | 10/2003 | Flender et al. |
| 2003/0233246 A1 | 12/2003 | Snapp et al. |
| 2004/0073520 A1 | 4/2004 | Eskandari |
| 2004/0093542 A1 | 5/2004 | Isodono et al. |
| 2004/0123247 A1 | 6/2004 | Wachen et al. |
| 2004/0133457 A1 | 7/2004 | Sadiq et al. |
| 2004/0148211 A1 | 7/2004 | Honarvar et al. |
| 2004/0210542 A1 | 10/2004 | Sweeney |
| 2004/0223648 A1 | 11/2004 | Hoene et al. |
| 2004/0249652 A1 | 12/2004 | Aldstadt |
| 2005/0027594 A1 | 2/2005 | Yasnovsky et al. |
| 2005/0096963 A1 | 5/2005 | Myr et al. |
| 2005/0189415 A1 | 9/2005 | Fano et al. |
| 2005/0201312 A1 | 9/2005 | Archacki |
| 2005/0246206 A1 | 11/2005 | Obora et al. |
| 2005/0256778 A1 | 11/2005 | Boyd et al. |
| 2005/0273376 A1 | 12/2005 | Ouimet et al. |
| 2005/0273380 A1 | 12/2005 | Schroeder et al. |
| 2006/0080265 A1 | 4/2006 | Hinds et al. |
| 2006/0163349 A1 | 7/2006 | Neugebauer |
| 2006/0167917 A1 | 7/2006 | Solomon |
| 2006/0259835 A1 | 11/2006 | Marinissen et al. |
| 2006/0271671 A1 | 11/2006 | Hansen |
| 2007/0022003 A1 | 1/2007 | Chao et al. |
| 2007/0038516 A1 | 2/2007 | Apple et al. |
| 2007/0073585 A1 | 3/2007 | Apple et al. |
| 2007/0094077 A1 | 4/2007 | Hallbauer et al. |
| 2007/0094093 A1 | 4/2007 | Hallbauer et al. |
| 2007/0118419 A1 | 5/2007 | Maga et al. |
| 2007/0143186 A1 | 6/2007 | Apple et al. |
| 2007/0174030 A1 | 7/2007 | Yun et al. |
| 2007/0282668 A1 | 12/2007 | Cereghini et al. |
| 2008/0021909 A1 | 1/2008 | Black et al. |
| 2008/0033784 A1 | 2/2008 | Chalimadugu et al. |
| 2008/0033808 A1 | 2/2008 | Black et al. |
| 2008/0077459 A1 | 3/2008 | Desai et al. |
| 2008/0126264 A1 | 5/2008 | Tellefsen et al. |
| 2008/0140502 A1 | 6/2008 | Birnholz et al. |
| 2008/0189156 A1 | 8/2008 | Voda et al. |
| 2008/0276270 A1 | 11/2008 | Kotaru et al. |
| 2008/0305460 A1 | 12/2008 | Garg |
| 2008/0306830 A1 | 12/2008 | Lasa et al. |
| 2009/0017913 A1 | 1/2009 | Bell et al. |
| 2009/0030785 A1 | 1/2009 | Goyal et al. |
| 2009/0030829 A1 | 1/2009 | Chatter et al. |
| 2009/0083121 A1 | 3/2009 | Angell et al. |
| 2009/0132447 A1 | 5/2009 | Milenova et al. |
| 2009/0204472 A1 | 8/2009 | Einhorn |
| 2009/0210286 A1 | 8/2009 | Bisdikian |
| 2009/0254413 A1 | 10/2009 | Chang et al. |
| 2009/0271275 A1 | 10/2009 | Regmi et al. |
| 2009/0282343 A1 | 11/2009 | Catlin et al. |
| 2009/0288012 A1 | 11/2009 | Hertel et al. |
| 2009/0292588 A1 | 11/2009 | Duzevik et al. |
| 2009/0292771 A1 | 11/2009 | Bertoni et al. |
| 2009/0304232 A1 | 12/2009 | Tsukizawa |
| 2009/0307073 A1 | 12/2009 | Mirroknibanadaki et al. |
| 2009/0313109 A1 | 12/2009 | Bous |
| 2010/0100419 A1 | 4/2010 | Natoli et al. |
| 2010/0106605 A1 | 4/2010 | Lin et al. |
| 2010/0145773 A1 | 6/2010 | Desai et al. |
| 2010/0153332 A1 | 6/2010 | Rollins et al. |
| 2010/0175084 A1 | 7/2010 | Ellis et al. |
| 2010/0179855 A1 | 7/2010 | Chen et al. |
| 2010/0250477 A1 | 9/2010 | Yadav |
| 2010/0250714 A1 | 9/2010 | Wehmann et al. |
| 2010/0274661 A1 | 10/2010 | Aaltonen et al. |
| 2010/0282836 A1 | 11/2010 | Kempf et al. |
| 2010/0306031 A1 | 12/2010 | McCauley et al. |
| 2011/0029360 A1 | 2/2011 | Gollapalli |
| 2011/0035379 A1 | 2/2011 | Chen et al. |
| 2011/0040756 A1 | 2/2011 | Jones et al. |
| 2011/0045831 A1 | 2/2011 | Chiu et al. |
| 2011/0119100 A1 | 5/2011 | Ruhl et al. |
| 2011/0119155 A1 | 5/2011 | Hammad et al. |
| 2011/0161113 A1 | 6/2011 | Rumak et al. |
| 2011/0173055 A1 | 7/2011 | Ross et al. |
| 2011/0196733 A1 | 8/2011 | Li et al. |
| 2011/0246994 A1 | 10/2011 | Kimbrel et al. |
| 2011/0251880 A1 | 10/2011 | Butler et al. |
| 2011/0258049 A1 | 10/2011 | Ramer et al. |
| 2011/0295722 A1 | 12/2011 | Reisman |
| 2011/0313835 A1 | 12/2011 | Falkenborg et al. |
| 2012/0022930 A1 | 1/2012 | Brouhard |
| 2012/0022938 A1 | 1/2012 | McNea et al. |
| 2012/0022944 A1 | 1/2012 | Volpi |

(56) References Cited

U.S. PATENT DOCUMENTS

| | | |
|---|---|---|
| 2012/0100134 A1 | 4/2012 | Lenz |
| 2012/0150576 A1 | 6/2012 | Wagenblatt |
| 2012/0158099 A1 | 6/2012 | Lee |
| 2012/0158474 A1 | 6/2012 | Fahner et al. |
| 2012/0191534 A1 | 7/2012 | Tavares et al. |
| 2012/0221372 A1 | 8/2012 | Vasko |
| 2012/0239537 A1 | 9/2012 | Baker et al. |
| 2012/0259698 A1 | 10/2012 | Yurow |
| 2012/0264089 A1 | 10/2012 | Hoang et al. |
| 2012/0290399 A1 | 11/2012 | England et al. |
| 2012/0303411 A1 | 11/2012 | Chen et al. |
| 2013/0006949 A1 | 1/2013 | Essawi et al. |
| 2013/0013404 A1 | 1/2013 | Suprock et al. |
| 2013/0030868 A1 | 1/2013 | Lyon et al. |
| 2013/0036015 A1 | 2/2013 | Bender et al. |
| 2013/0046605 A1 | 2/2013 | Baron et al. |
| 2013/0073388 A1 | 3/2013 | Heath |
| 2013/0085838 A1 | 4/2013 | Tennenholtz et al. |
| 2013/0085844 A1 | 4/2013 | Neystadt et al. |
| 2013/0091019 A1 | 4/2013 | Mallon et al. |
| 2013/0097006 A1 | 4/2013 | Evans et al. |
| 2013/0110641 A1 | 5/2013 | Ormont et al. |
| 2013/0110880 A1 | 5/2013 | Farchi et al. |
| 2013/0124257 A1 | 5/2013 | Schubert |
| 2013/0124361 A1 | 5/2013 | Bryson |
| 2013/0138812 A1 | 5/2013 | Assuncao et al. |
| 2013/0148813 A1 | 6/2013 | Sengupta et al. |
| 2013/0151332 A1 | 6/2013 | Yan et al. |
| 2013/0185147 A1 | 7/2013 | Letca et al. |
| 2013/0226691 A1 | 8/2013 | Chatow et al. |
| 2013/0238416 A1 | 9/2013 | Richard |
| 2013/0238617 A1 | 9/2013 | Postrel |
| 2013/0246217 A1 | 9/2013 | Denton et al. |
| 2013/0254151 A1 | 9/2013 | Mohagheghi et al. |
| 2013/0290096 A1 | 10/2013 | Lizotte |
| 2013/0297543 A1 | 11/2013 | Treiser |
| 2013/0331999 A1 | 12/2013 | Vaughn et al. |
| 2013/0346302 A1 | 12/2013 | Purves et al. |
| 2014/0006129 A1 | 1/2014 | Heath |
| 2014/0019228 A1 | 1/2014 | Aggarwal et al. |
| 2014/0025391 A1 | 1/2014 | Knowles et al. |
| 2014/0040007 A1 | 2/2014 | Relyea, Jr. et al. |
| 2014/0046757 A1 | 2/2014 | Kahn et al. |
| 2014/0046872 A1 | 2/2014 | Arnott et al. |
| 2014/0074595 A1 | 3/2014 | Chomsky et al. |
| 2014/0081636 A1 | 3/2014 | Erhart et al. |
| 2014/0081722 A1 | 3/2014 | Schacht |
| 2014/0081741 A1 | 3/2014 | Katsur |
| 2014/0095281 A1 | 4/2014 | Weiss et al. |
| 2014/0095410 A1 | 4/2014 | Chen et al. |
| 2014/0095611 A1 | 4/2014 | Weinstein et al. |
| 2014/0122200 A1 | 5/2014 | Granville |
| 2014/0136537 A1 | 5/2014 | Nelson et al. |
| 2014/0143405 A1 | 5/2014 | Pavlidis et al. |
| 2014/0180790 A1 | 6/2014 | Boal |
| 2014/0180809 A1 | 6/2014 | Boal |
| 2014/0180811 A1 | 6/2014 | Boal |
| 2014/0236706 A1 | 8/2014 | Opie et al. |
| 2014/0278786 A1 | 9/2014 | Liu-Qiu-Yan |
| 2014/0278798 A1 | 9/2014 | Goyal et al. |
| 2014/0330633 A1 | 11/2014 | Moran et al. |
| 2014/0337120 A1 | 11/2014 | Ercanbrack |
| 2014/0344051 A1 | 11/2014 | Ouimet |
| 2015/0019325 A1 | 1/2015 | Li et al. |
| 2015/0049924 A1 | 2/2015 | Tang et al. |
| 2015/0050970 A1 | 2/2015 | Racho |
| 2015/0058087 A1 | 2/2015 | Kulagin et al. |
| 2015/0117631 A1 | 4/2015 | Tuchman et al. |
| 2015/0142557 A1 | 5/2015 | Krishnamurthy et al. |
| 2015/0150023 A1 | 5/2015 | Johnson et al. |
| 2015/0248630 A1 | 9/2015 | Ramanan et al. |
| 2015/0310188 A1 | 10/2015 | Ford et al. |
| 2015/0317682 A1 | 11/2015 | Kayser et al. |
| 2015/0332208 A1 | 11/2015 | Scott et al. |
| 2015/0332308 A1 | 11/2015 | Liu |
| 2016/0155193 A1 | 6/2016 | Merrill et al. |
| 2016/0162931 A1 | 6/2016 | Harik et al. |
| 2016/0189278 A1 | 6/2016 | Parpia et al. |
| 2017/0032407 A1 | 2/2017 | Moran |
| 2017/0053305 A1 | 2/2017 | Montero et al. |
| 2017/0098257 A1 | 4/2017 | Keller |
| 2017/0109767 A1 | 4/2017 | Shpanya et al. |
| 2017/0140603 A1 | 5/2017 | Ricci |
| 2017/0161791 A1 | 6/2017 | Zaheer et al. |
| 2017/0249664 A1 | 8/2017 | Harik et al. |
| 2017/0345096 A1 | 11/2017 | Umblijs et al. |
| 2018/0068340 A1 | 3/2018 | Jaidka et al. |
| 2018/0108035 A1 | 4/2018 | Tiwari |
| 2018/0211272 A1 | 7/2018 | Deshpande et al. |
| 2018/0336597 A1 | 11/2018 | Singh et al. |
| 2018/0341897 A1 | 11/2018 | Ames |
| 2019/0080361 A1 | 3/2019 | Green |
| 2019/0147425 A1 | 5/2019 | Sundholm |
| 2019/0180302 A1 | 6/2019 | Ventrice et al. |
| 2019/0347681 A1 | 11/2019 | Liu et al. |
| 2020/0019922 A1 | 1/2020 | Harsha et al. |
| 2021/0103945 A1 | 4/2021 | Montero et al. |
| 2021/0142387 A1* | 5/2021 | Gupta .................. G06N 3/006 |

FOREIGN PATENT DOCUMENTS

| | | |
|---|---|---|
| WO | WO 2018/200546 A1 | 11/2018 |
| WO | WO 2018/213019 A1 | 11/2018 |

OTHER PUBLICATIONS

Molina Rodriguez, Next-generation manufacturing systems: key research issues in developing and integrating reconfigurable and intelligent machines, 2007 (Yea: 2007).

USPTO, ISA/US, "Notification of Transmittal of the ISR and the Written Opinion of the International Searching Authority, or the Declaration," in PCT Application No. PCT/US2018/030985, dated Aug. 24, 2018, 7 pages.

Boughzala, I. et al. "Characterization and Evaluation of Serious Games: A Perspective of Their Use in Higher Education," 46th Hawaii International Conference on System Sciences, Jan. 7-10, 2013, pp. 844-852.

Campbell, N. R. "Physics: The Elements," Cambridge University Press, 1920, pp. 267-293.

Chen, J. et al., "Deep CTR Prediction in Display Advertising" MM '16: Proceedings of the 24th ACM international conference on Multimedia, Oct. 2016, pp. 811-820.

David, B. et al. "Collaborative Systems & Shared Economy (Uberization): Principles & Case Study," International Conference on Collaboration Technologies and Systems, 2016, pp. 57-63.

Dumitrascu, B. et al. "PG-TS: Improved Thompson Sampling for Logistic Contextual Bandits," *Advances in Neural Information Processing Systems*, $32^{nd}$ Conference on Neural Information Processing Systems, Montreal, Canada, 2018, pp. 1-10.

European Patent Office, Extended European Search Report and Opinion, EP Patent Application No. 18851705.6, dated Jan. 15, 2021, seven pages.

European Patent Office, Extended European Search Report and Opinion, EP Patent Application No. 19871600.3, dated May 25, 2022, eight pages.

Fasuga, R. et al. "An Intelligent Tool for All-to-All Sales on the Internet: Platform for Compilation of Commercial Offers and Requests for Companies and Customers," 12th International Joint Conference on e-Business and Telecommunications, Jul. 20-22, 2015, pp. 263-270.

Goebel, C. et al. "The Information Value of Item-Level RFID in Retail Supply Chain Operations," 44th Hawaii International Conference on System Sciences, Feb. 2011, pp. 1-10.

Green, P. et al. "Conjoint Analysis in Consumer Research: Issues and Outlook," *Journal of Consumer Research*, vol. 5, No. 2, Sep. 1978, pp. 103-123.

Hoch, S. J. et al. "Determinants of Store-Level Price Elasticity," *Journal of Marketing Research*, vol. 32, No. 1, Feb. 1995, pp. 17-29.

(56) References Cited

OTHER PUBLICATIONS

Huang, S. et al. "Strategy, Model, and Platform for Collaborative Commerce," IEEE International Conference on e-Business Engineering, Oct. 24-26, 2007, pp. 304-311.
Madansky, A. "On Conjoint Analysis and Quantal Choice Models," University of Chicago Press, *Journal of Business*, vol. 53, No. 3, Jul. 1980, pp. S37-S44.
Nafari, M. et al. "A Data Mining Approach for Finding Optimal Discount of Retail Assortments," 11th International Conference on Computer and Information Technology, Dec. 24-28, 2008, pp. 20-27.
PCT International Search Report and Written Opinion, PCT Application No. PCT/US2018/049284, dated Nov. 30, 2018, 8 pages.
PCT International Search Report and Written Opinion, PCT Application No. PCT/US2018/057409, dated Jan. 16, 2019, 6 pages.
PCT International Search Report and Written Opinion, PCT Application No. PCT/US2019/055259, dated Dec. 26, 2019, 15 pages.
PCT International Search Report and Written Opinion, PCT Application No. PCT/US2022/012206, dated Apr. 12, 2022, 22 pages.
PCT International Search Report and Written Opinion, PCT Application No. PCT/US22/30392, dated Sep. 9, 2022, 12 pages.
Rao, V. R. "Applied Conjoint Analysis," New York: Springer, 2014.
Schrage, M. "The Innovator's Hypothesis: How Cheap Experiments Are Worth More Than Good Ideas," MIT Press, 2014, pp. 103-111.
Sen, S. et al. "Incentivizing Time-Shifting of Data: A Survey of Time-Dependent Pricing for Internet Access," IEEE Communications Magazine, vol. 50, No. 11, Nov. 2012, pp. 91-99.
United States Office Action, U.S. Appl. No. 16/120,178, dated Aug. 4, 2021, 24 pages.
United States Office Action, U.S. Appl. No. 16/120,178, dated Jan. 21, 2021, 26 pages.
United States Office Action, U.S. Appl. No. 16/120,178, dated Jun. 24, 2022, 25 pages.
United States Office Action, U.S. Appl. No. 16/120,178, dated Mar. 16, 2022, 24 pages.
United States Office Action, U.S. Appl. No. 16/120,178, dated Mar. 5, 2020, 27 pages.
United States Office Action, U.S. Appl. No. 16/120,178, dated Nov. 1, 2019, 27 pages.
United States Office Action, U.S. Appl. No. 16/120,178, dated Nov. 28, 2022, 19 pages.
United States Office Action, U.S. Appl. No. 16/120,178, dated Nov. 8, 2021, 24 pages.
United States Office Action, U.S. Appl. No. 16/120,178, dated Sep. 14, 2020, 26 pages.
United States Office Action, U.S. Appl. No. 17/076,802, dated Jul. 12, 2022, 12 pages.
United States Office Action, U.S. Appl. No. 17/076,802, dated Mar. 30, 2022, 18 pages.
United States Office Action, U.S. Appl. No. 17/240,299, dated Mar. 14, 2022, 19 pages.
United States Office Action, U.S. Appl. No. 17/240,299, dated Sep. 19, 2022, 21 pages.
United States Office Action, U.S. Appl. No. 17/573,620, dated Aug. 3, 2022, 21 pages.
United States Office Action, U.S. Appl. No. 17/585,526, dated Nov. 28, 2022, six pages.
United States Office Action, U.S. Appl. No. 17/670,402, dated Nov. 28, 2022, 14 pages.
United States Office Action, U.S. Appl. No. 17/676,095, dated Nov. 29, 2022, 13 pages.
United States Office Action, U.S. Appl. No. 17/076,802, dated Feb. 17, 2023, 20 pages.
United States Office Action, U.S. Appl. No. 17/749,041, dated Jan. 30, 2023, 30 pages.
United States Office Action, U.S. Appl. No. 17/676,095, dated Mar. 16, 2023, 25 pages.
United States Office Action, U.S. Appl. No. 17/670,402, dated Mar. 16, 2023, 23 pages.
United States Office Action, U.S. Appl. No. 16/120, 178, dated Mar. 16, 2023, 37 pages.

\* cited by examiner

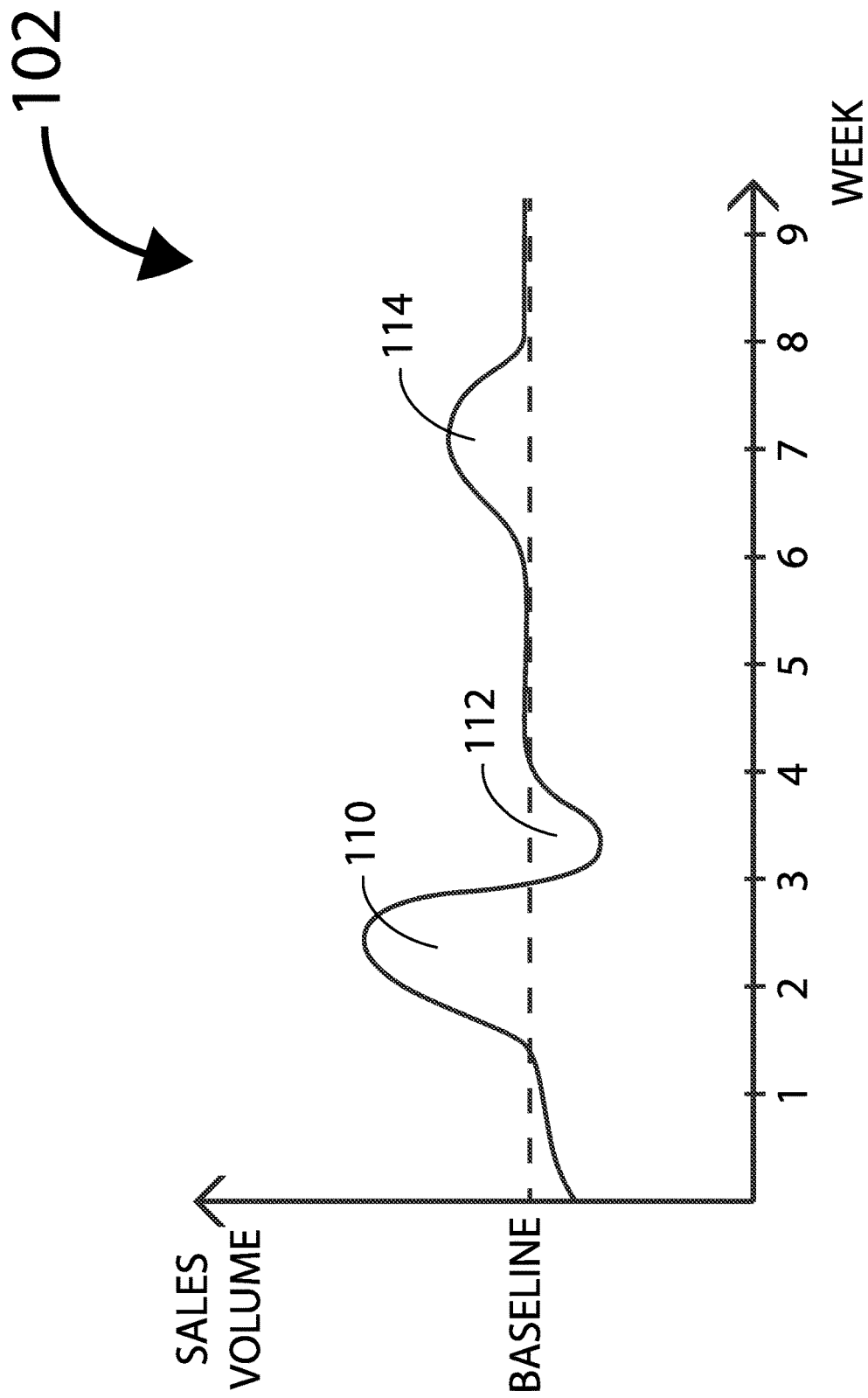

1100A

| VARIABLE A | VARIABLE B | ... | VARIABLE M |
|---|---|---|---|
| VALUE A-1 | VALUE B-1 | | VALUE M-1 |
| VALUE A-1 | VALUE B-1 | | VALUE M-2 |
| VALUE A-1 | VALUE B-1 | | ⋮ |
| VALUE A-1 | VALUE B-1 | | VALUE M-R |
| VALUE A-1 | VALUE B-2 | | VALUE M-1 |
| VALUE A-1 | VALUE B-2 | ... | VALUE M-2 |
| VALUE A-1 | VALUE B-2 | | ⋮ |
| VALUE A-1 | VALUE B-2 | | VALUE M-R |
| ⋮ | ⋮ | | ⋮ |
| VALUE A-1 | VALUE B-Q | | VALUE M-1 |
| VALUE A-1 | VALUE B-Q | ... | VALUE M-2 |
| VALUE A-1 | VALUE B-Q | | ⋮ |
| VALUE A-1 | VALUE B-Q | | VALUE M-R |
| ⋮ | ⋮ | | ⋮ |
| VALUE A-2 | VALUE B-1 | | VALUE M-1 |
| VALUE A-2 | VALUE B-1 | ... | VALUE M-2 |
| VALUE A-2 | VALUE B-1 | | ⋮ |
| VALUE A-2 | VALUE B-1 | | VALUE M-R |
| ⋮ | ⋮ | | ⋮ |
| VALUE A-P | VALUE B-Q | | VALUE M-1 |
| VALUE A-P | VALUE B-Q | ... | VALUE M-2 |
| VALUE A-P | VALUE B-Q | | ⋮ |
| VALUE A-P | VALUE B-Q | | VALUE M-R |

| VARIABLE A | VARIABLE B | VARIABLE C |
|---|---|---|
| VALUE A-1 | VALUE B-1 | VALUE C-1 |
| VALUE A-1 | VALUE B-1 | VALUE C-2 |
| VALUE A-1 | VALUE B-1 | VALUE C-3 |
| VALUE A-1 | VALUE B-2 | VALUE C-1 |
| VALUE A-1 | VALUE B-2 | VALUE C-2 |
| VALUE A-1 | VALUE B-2 | VALUE C-3 |
| VALUE A-1 | VALUE B-3 | VALUE C-1 |
| VALUE A-1 | VALUE B-3 | VALUE C-2 |
| VALUE A-1 | VALUE B-3 | VALUE C-3 |
| VALUE A-1 | VALUE B-4 | VALUE C-1 |
| VALUE A-1 | VALUE B-4 | VALUE C-2 |
| VALUE A-1 | VALUE B-4 | VALUE C-3 |
| VALUE A-2 | VALUE B-1 | VALUE C-1 |
| VALUE A-2 | VALUE B-1 | VALUE C-2 |
| VALUE A-2 | VALUE B-1 | VALUE C-3 |
| VALUE A-2 | VALUE B-2 | VALUE C-1 |
| VALUE A-2 | VALUE B-2 | VALUE C-2 |
| VALUE A-2 | VALUE B-2 | VALUE C-3 |
| VALUE A-2 | VALUE B-3 | VALUE C-1 |
| VALUE A-2 | VALUE B-3 | VALUE C-2 |
| VALUE A-2 | VALUE B-3 | VALUE C-3 |
| VALUE A-2 | VALUE B-4 | VALUE C-1 |
| VALUE A-2 | VALUE B-4 | VALUE C-2 |
| VALUE A-2 | VALUE B-4 | VALUE C-3 |

| VARIABLE A | VARIABLE B | VARIABLE C |
|---|---|---|
| VALUE A-1 | VALUE B-1 | VALUE C-1 |
| VALUE A-1 | VALUE B-1 | VALUE C-2 |
| VALUE A-1 | VALUE B-1 | VALUE C-3 |
| VALUE A-1 | VALUE B-2 | VALUE C-1 |
| VALUE A-1 | VALUE B-2 | VALUE C-2 |
| VALUE A-1 | VALUE B-2 | VALUE C-3 |
| VALUE A-1 | VALUE B-3 | VALUE C-1 |
| VALUE A-1 | VALUE B-3 | VALUE C-2 |
| VALUE A-1 | VALUE B-3 | VALUE C-3 |
| VALUE A-1 | VALUE B-4 | VALUE C-1 |
| VALUE A-1 | VALUE B-4 | VALUE C-2 |
| VALUE A-1 | VALUE B-4 | VALUE C-3 |
| VALUE A-2 | VALUE B-1 | VALUE C-1 |
| VALUE A-2 | VALUE B-1 | VALUE C-2 |
| VALUE A-2 | VALUE B-1 | VALUE C-3 |
| VALUE A-2 | VALUE B-2 | VALUE C-1 |
| VALUE A-2 | VALUE B-2 | VALUE C-2 |
| VALUE A-2 | VALUE B-2 | VALUE C-3 |
| VALUE A-2 | VALUE B-3 | VALUE C-1 |
| VALUE A-2 | VALUE B-3 | VALUE C-2 |
| VALUE A-2 | VALUE B-3 | VALUE C-3 |
| VALUE A-2 | VALUE B-4 | VALUE C-1 |
| VALUE A-2 | VALUE B-4 | VALUE C-2 |
| VALUE A-2 | VALUE B-4 | VALUE C-3 |

Fig. 11C

| OFFER # | VARIABLE A | VARIABLE B | VARIABLE C |
|---|---|---|---|
| 1 | VALUE A-1 | VALUE B-1 | VALUE C-1 |
| 2 | VALUE A-1 | VALUE B-1 | VALUE C-3 |
| 3 | VALUE A-1 | VALUE B-2 | VALUE C-1 |
| 4 | VALUE A-1 | VALUE B-2 | VALUE C-3 |
| 5 | VALUE A-1 | VALUE B-3 | VALUE C-1 |
| 6 | VALUE A-1 | VALUE B-3 | VALUE C-3 |
| 7 | VALUE A-1 | VALUE B-4 | VALUE C-1 |
| 8 | VALUE A-1 | VALUE B-4 | VALUE C-3 |
| 9 | VALUE A-2 | VALUE B-1 | VALUE C-1 |
| 10 | VALUE A-2 | VALUE B-1 | VALUE C-3 |
| 11 | VALUE A-2 | VALUE B-2 | VALUE C-1 |
| 12 | VALUE A-2 | VALUE B-2 | VALUE C-3 |
| 13 | VALUE A-2 | VALUE B-3 | VALUE C-1 |
| 14 | VALUE A-2 | VALUE B-3 | VALUE C-3 |
| 15 | VALUE A-2 | VALUE B-4 | VALUE C-1 |
| 16 | VALUE A-2 | VALUE B-4 | VALUE C-3 |

Fig. 12A

| OFFER # | VARIABLE A | VARIABLE B | VARIABLE C |
|---|---|---|---|
| 1 | VALUE A-1 | VALUE B-1 | VALUE C-1 |
| 2 | VALUE A-1 | VALUE B-1 | VALUE C-3 |
| 3 | VALUE A-1 | VALUE B-2 | VALUE C-1 |
| 4 | VALUE A-1 | VALUE B-2 | VALUE C-3 |
| 5 | VALUE A-1 | VALUE B-3 | VALUE C-1 |
| 6 | VALUE A-1 | VALUE B-3 | VALUE C-3 |
| 7 | VALUE A-1 | VALUE B-4 | VALUE C-1 |
| 8 | VALUE A-1 | VALUE B-4 | VALUE C-3 |
| 9 | VALUE A-2 | VALUE B-1 | VALUE C-1 |
| 10 | VALUE A-2 | VALUE B-1 | VALUE C-3 |
| 11 | VALUE A-2 | VALUE B-2 | VALUE C-1 |
| 12 | VALUE A-2 | VALUE B-2 | VALUE C-3 |
| 13 | VALUE A-2 | VALUE B-3 | VALUE C-1 |
| 14 | VALUE A-2 | VALUE B-3 | VALUE C-3 |
| 15 | VALUE A-2 | VALUE B-4 | VALUE C-1 |
| 16 | VALUE A-2 | VALUE B-4 | VALUE C-3 |

| OFFER # | VARIABLE A | VARIABLE B | VARIABLE C | V-A | V-B | V-C | KLIP RATE | IMPRESSIONS |
|---|---|---|---|---|---|---|---|---|
| 1 | VALUE A-1 | VALUE B-1 | VALUE C-2 | 0 | 0 | 1 | 0.020 | 20000 |
| 2 | VALUE A-1 | VALUE B-2 | VALUE C-1 | 0 | 1 | 0 | 0.015 | 20000 |
| 3 | VALUE A-2 | VALUE B-1 | VALUE C-1 | 1 | 0 | 0 | 0.010 | 20000 |
| 4 | VALUE A-2 | VALUE B-2 | VALUE C-2 | 1 | 1 | 1 | 0.012 | 20000 |

| PAIR ID | PAIRS | DIFA | DIFB | DIFC | OFF1 | OFF2 | OFF3 | OFF4 | DELTA | NORM SCORE |
|---|---|---|---|---|---|---|---|---|---|---|
| 1 | 1-2 | 0 | -1 | 1 | 1 | -1 | 0 | 0 | 0.005 | 3.813850 |
| 2 | 1-3 | -1 | 0 | 1 | 1 | 0 | -1 | 0 | 0.010 | 8.233870 |
| 3 | 1-4 | -1 | -1 | 0 | 0 | 0 | 0 | -1 | 0.008 | 6.379009 |
| 4 | 2-3 | -1 | 1 | 0 | 0 | 1 | -1 | 0 | 0.005 | 4.501491 |
| 5 | 2-4 | -1 | 0 | -1 | 0 | 1 | 0 | -1 | 0.003 | 2.599815 |
| 6 | 3-4 | 0 | -1 | -1 | 0 | 0 | 1 | -1 | 0.002 | -1.917589 |

| OFFER # | ESTIMATE | STD. ERROR | T VALUE | PR(>|T|) |
|---|---|---|---|---|
| INTERCEPT | 0.009371836 | 0.03820258 | 0.2453194 | 0.8290853807 |
| 1 | 6.3579335592 | 0.063351582 | 100.3591350 | 0.0000992708 |
| 2 | 2.5778011274 | 0.04678842 | 55.0948587 | 0.0003292784 |
| 3 | -1.902614363 | 0.03308441 | -57.5078867 | 0.0003022374 |

Fig. 15

| OFFER # | VARIABLE A | VARIABLE B | VARIABLE C |
|---|---|---|---|
| 1 | VALUE A-1 | VALUE B-1 | VALUE C-1 |
| 2 | VALUE A-1 | VALUE B-1 | VALUE C-3 |
| 3 | VALUE A-1 | VALUE B-2 | VALUE C-1 |
| 4 | VALUE A-1 | VALUE B-2 | VALUE C-3 |
| 5 | VALUE A-1 | VALUE B-3 | VALUE C-1 |
| 6 | VALUE A-1 | VALUE B-3 | VALUE C-3 |
| 7 | VALUE A-1 | VALUE B-4 | VALUE C-1 |
| 8 | VALUE A-1 | VALUE B-4 | VALUE C-3 |
| 9 | VALUE A-2 | VALUE B-1 | VALUE C-1 |
| 10 | VALUE A-2 | VALUE B-1 | VALUE C-3 |
| 11 | VALUE A-2 | VALUE B-2 | VALUE C-1 |
| 12 | VALUE A-2 | VALUE B-2 | VALUE C-3 |
| 13 | VALUE A-2 | VALUE B-3 | VALUE C-1 |
| 14 | VALUE A-2 | VALUE B-3 | VALUE C-3 |
| 15 | VALUE A-2 | VALUE B-4 | VALUE C-1 |
| 16 | VALUE A-2 | VALUE B-4 | VALUE C-3 |

Fig. 16

SYSTEMS AND METHODS FOR INTELLIGENT PROMOTION DESIGN WITH PROMOTION SELECTION

CROSS REFERENCE TO RELATED APPLICATIONS

This Continuation Application claims the benefit of U.S. application Ser. No. 17/234,698, filed on Apr. 19, 2021, of the same title, pending, which is a Continuation Application and claims the benefit of U.S. application Ser. No. 15/597,138 filed on May 16, 2017, of the same title, now U.S. Pat. No. 10,984,441, issued Apr. 20, 2021, which claims the benefit of U.S. Continuation-in-part application Ser. No. 14/209,851 filed on Mar. 13, 2014, entitled "Architecture and Methods for Promotion Optimization," now U.S. Pat. No. 9,984,387 issued May 29, 2018, which claims benefit and priority under 35 U.S.C. 119(e) to a commonly owned U.S. Provisional Application No. 61/780,630 filed on Mar. 13, 2013, entitled "Architecture and Methods for Promotion Optimization," all of which are incorporated herein by reference.

The present invention is additionally related to the following patents, all of which are incorporated herein by reference:

Commonly owned U.S. application Ser. No. 14/231,426, filed on Mar. 31, 2014, entitled "Adaptive Experimentation and Optimization in Automated Promotional Testing," now U.S. Pat. No. 10,438,230 issued Oct. 8, 2019.

Commonly owned U.S. application Ser. No. 14/231,432, filed on Mar. 31, 2014, entitled "Automated and Optimal Promotional Experimental Test Designs Incorporating Constraints," now U.S. Pat. No. 9,940,639 issued Apr. 10, 2018.

Commonly owned U.S. application Ser. No. 14/231,440, filed on Mar. 31, 2014, entitled "Automatic Offer Generation Using Concept Generator Apparatus and Methods Therefor," now U.S. Pat. No. 10,438,231 issued Oct. 8, 2019.

Commonly owned U.S. application Ser. No. 14/231,442, filed on Mar. 31, 2014, entitled "Automated Event Correlation to Improve Promotional Testing," now U.S. Pat. No. 9,940,640 issued Apr. 10, 2018.

Commonly owned U.S. application Ser. No. 14/231,460, filed on Mar. 31, 2014, entitled "Automated Promotion Forecasting and Methods Therefor," now U.S. Pat. No. 10,445,763 issued Oct. 15, 2019.

Commonly owned U.S. application Ser. No. 14/231,555, filed on Mar. 31, 2014, entitled "Automated Behavioral Economics Patterns in Promotion Testing and Methods Therefor," now U.S. Pat. No. 10,140,629 issued Nov. 27, 2018.

All the applications/patents listed above are incorporated herein in their entirety by this reference.

BACKGROUND

The present invention relates generally to promotion optimization methods and apparatus therefor. More particularly, the present invention relates to computer-implemented methods and computer-implemented apparatus for the generation of a batch of promotions utilizing intelligent design criteria to maximize promotion experimentation.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (i.e., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code) designed to, for example, promote the sales volume of a particular product or service. One aspect of promotion may also refer to the bundling of goods or services to create a more desirable selling unit such that sales volume may be improved. Another aspect of promotion may also refer to the merchandising design (with respect to looks, weight, design, color, etc.) or displaying of a particular product with a view to increasing its sales volume. It includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In discussing various embodiments of the present invention, the sale of consumer packaged goods (hereinafter "CPG") is employed to facilitate discussion and ease of understanding. It should be kept in mind, however, that the promotion optimization methods and apparatuses discussed herein may apply to any industry in which promotion has been employed in the past or may be employed in the future.

Further, price discount is employed as an example to explain the promotion methods and apparatuses herein. It should be understood, however, that promotion optimization may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The promotion may be specifically targeted to an individual consumer (based on, for example, that consumer's demographics or past buying behavior). The discount may alternatively be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyalty card user base.

In an example, if the consumer redeems the coupon or electronic code, the consumer is entitled to a reduced price for the CPG item. The revenue loss to the retailer due to the redeemed discount may be reimbursed, wholly or partly, by the manufacturer of the CPG item in a separate transaction.

Because promotion is expensive (in terms of, for example, the effort to conduct a promotion campaign and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

One problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion optimization approaches tend to evaluate sales lifts or dips as a function of four main factors: discount depth (e.g., how much was the discount on the CPG item), discount duration (e.g., how long did the promotion campaign last), timing (e.g., whether there was any special holidays or event or weather involved), and promotion type (e.g., whether the promotion was a price discount only, whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers bought Brand X instead for convenience sake. Aggregate historical sales volume data for Brand X cookies, when examined after the fact in isolation by Brand X marketing department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk-buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take these unanticipated events into account but unless every SKU (stock keeping unit) in that store and in stores within commuting distance and all events, whether seemingly related or unrelated to the sales of Brand X cookies, are modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual.

Some companies may vary the approach by, for example, ascertaining the items purchased by the consumer at the point of sale terminal and offering a redeemable code on the purchase receipt. Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item to the general public.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer may state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and more importantly, it has been known that conjoint studies are somewhat unreliable in gauging actual purchasing behavior by consumers in the future. An individual may state out of guilt and the knowledge that he needs to lose weight that he will not purchase any cookies in the next six months, irrespective of discounts. In actuality, that individual may pick up a package of cookies every week if such package is carried in a certain small size that is less guilt-inducing and/or if the package of cookies is prominently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

Previous disclosures by the applicants have focused upon the ability to generate and administer a plurality of test promotions across consumer segments in a rapid manner in order to overcome the foregoing issues in a manner that results in cost-effective, high-return, and timely promotions to the general public. However, there are still remaining issues regarding how to best generate the initial promotions. Previously, ad managers have often relied upon intuition and historical activity to generate the promotions presented to the users. Such systems, even when able to rapidly generate and deploy numerous advertising campaigns often result in missed opportunity since the initial design constraints put forth by a user is less than ideal.

It is therefore apparent that an urgent need exists for systems and methods that enable a user to generate advertisement designs that most effectively explore the experimental space of a possible promotion in order to efficiently hone in on potent general promotions.

SUMMARY

To achieve the foregoing and in accordance with the present invention, systems and methods for the generation of intelligent promotional designs is provided.

In some embodiments, methods and systems for the selection of the promotions are provided. In these methods and systems a set of possible offers are initially received. The possible offers each include a set of variables, with each variable having a set of possible values. These form a combination of variable values for each offer. A heuristic is applied to all possible offers to reduce the number of offers being considered. The heuristics include rounding rules, and predefined rules corresponding to goals. A user selects the goal(s) and the associated predefined rules are applied to the set of offers, in these instances.

The combination of variable values for these reduced number of considered promotional offers is then converted into a vector value for each offer. The vector values are then scored, ranked and the top ranked offers are selected for inclusion in a promotional campaign. The remaining offers are then analyzed to select additional offers to include into the promotional campaign which maximizing a determinant for the selected offers using their vectors. The determinate is calculated by generating a matrix X of the vectors of the offers being considered. The determinate is calculated for ($X^TX$).

Lastly, all selected offers may be administer in a promotional test campaign across many consumer segments. Feedback from the campaign may be collected to refine an optimized "general" offer.

Scoring of the offers is completed by receiving a set of training offers, which include combinations of variable values. These combinations of variable values are converted into a vector value. The offers are paired and the vectors subtracted from one another, resulting in a pair vector. Metrics for the success of offers is collected, and are subtracted from one another for the paired offers to generate a raw score. This raw score is then normalized using the pair vector. The normalized scores are utilized to generate a model for the impact any variable value has on offer success, which may then be applied, using linear regression, to the reduced set of possible offers to generate an expected level of success.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 1 shows an example demand curve 102 for Brand X cookies over some period of time;

FIGS. 11A-C show, in accordance with some embodiments, example tables illustrating possible variable values with and without applied heuristics;

FIGS. 12A-B show, in accordance with some embodiments, the selection of top offers based upon performance modeling from the variable value tables that have been subjected to heuristic refinement;

FIGS. 13-15 show, in accordance with some embodiments, example tables of the scoring of the selected top promotions;

FIG. 16 shows, in accordance with some embodiments, the variable value table where the remaining X percentage of the offers are selected for promotional experimentation;

DETAILED DESCRIPTION

Figure 2A:
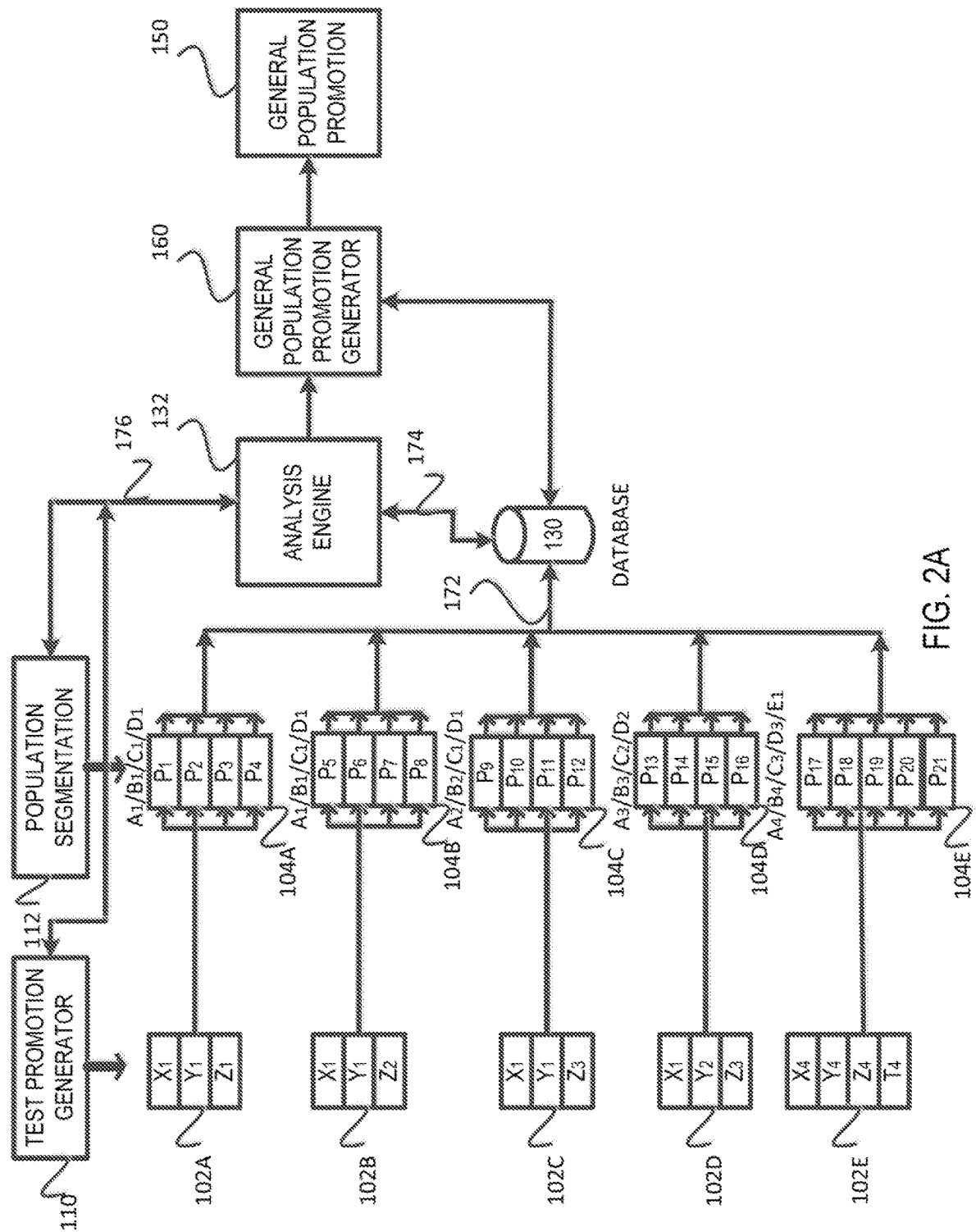
FIG. 2A shows, in accordance with an embodiment of the invention, a conceptual drawing of the forward-looking promotion optimization method.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to the generation of intelligent promotional designs for most effective experimentation of promotions to more efficiently identify a highly effective general promotion. Such systems and methods assist administrator users to generate and deploy advertising campaigns. While such systems and methods may be utilized with any promotional setting system, such intelligent promotional design systems particularly excel when coupled with systems for optimizing promotions by administering, in large numbers and iteratively, test promotions on purposefully segmented subpopulations in advance of a general public promotion roll-out. In one or more embodiments, the inventive forward-looking promotion optimization (FL-PO) involves obtaining actual revealed preferences from individual consumers of the segmented subpopulations being tested. As such the following disclosure will focus upon mechanisms of forward looking promotional optimizations, in order to understand the context within which the intelligent promotional design system excels.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Forward Looking Promotion Optimization

Within the forward-looking promotion optimization, the revealed preferences are obtained when the individual consumers respond to specifically designed actual test promotions. The revealed preferences are tracked in individual computer-implemented accounts (which may, for example, be implemented via a record in a centralized database and rendered accessible to the merchant or the consumer via a computer network such as the internet) associated with individual consumers. For example, when a consumer responds, using his smart phone or web browser, to a test promotion that offers 20% off a particular consumer packaged goods (CPG) item, that response is tracked in his individual computer-implemented account. Such computer-implemented accounts may be implemented via, for example, a loyalty card program, apps on a smart phone, computerized records accessible via a browser, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the general population promotion.

As will be discussed later herein, if the consumer actually redeems the offer, one type of response is recorded and noted in the computer-implemented account of that consumer. Even if an action by the consumer does not involve actually redeeming or actually taking advantage of the promotional offer right away, an action by that consumer may, however, constitute a response that indicates a level of interest or lack of interest and may still be useful in revealing the consumer preference (or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. Different types of responses by the consumers may be accorded different weights, in one or more embodiments.

The groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc.), weather, shopping habits, life style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt.

In designing different test promotions, one or more of the test promotions variables may vary or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best or well with respect to test promotion responses. In this manner, test promotion response analysis provides insights not only regarding the relative performance of the test promotion and/or test promotion variable but also insights regarding population segmentation and/or segmentation criteria. In an embodiment, it is contemplated that the segments may be arbitrarily or randomly segmented into groups and test promotions may be executed against these arbitrarily segmented groups in order to obtain insights regarding personal characteristics that respond well to a particular type of promotion.

In an embodiment, the identified test promotion variable(s) that yield the most desirable responses may then be employed to formulate a general public promotion (GPP), which may then be offered to the larger public. A general public promotion is different from a test promotion in that a general public promotion is a promotion designed to be offered to members of the public to increase or maximize sales or profit whereas a test promotion is designed to be targeted to a small group of individuals fitting a specific segmentation criteria for the purpose of promotion testing. Examples of general public promotions include (but not limited to) advertisement printed in newspapers, release in public forums and websites, flyers for general distribution, announcement on radios or television, and/or promotion broadly transmitted or made available to members of the public. The general public promotion may take the form of a paper or electronic circular that offers the same promotion to the larger public, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the generalized public promotion. In this manner, "false positives" may be reduced.

Since a test promotion may involve many test promotion variables, iterative test promotion testing, as mentioned, may help pin-point a variable (i.e., promotion feature) that yields the most desirable test promotion response to a particular subpopulation or to the general public.

Suppose, for example, that a manufacturer wishes to find out the most effective test promotion for packaged potato chips. One test promotion may reveal that consumers tend to buy a greater quantity of potato chips when packaged in brown paper bags versus green paper bags. That "winning" test promotion variable value (i.e., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the general public promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences. In other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a general population member may be expected to behave when presented with the same or a similar promotion in a general public promotion. Accordingly, there is a closer relationship between the test promotion response behavior (obtained in response to the test promotions) and the general public response behavior when a general public promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future general public promotions. In this manner, data regarding the "expected" efficacy of the proposed general public promotion is obtained even before the proposed general public promotion is released to the public. This is one key driver in obtaining highly effective general public promotions at low cost.

Furthermore, the subpopulations can be generated with highly granular segmenting criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time or day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $Z price would be one sentence structure, whereas Get Y for $Z when you buy X would be a second. It's important to differentiate that the consumer call to action in those two examples is materially different, and one cannot assume the promotional response will be the same when using one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts. In following sections one mechanism, the design matrix, for the automation of promotional generation will be provided in greater detail.

In one or more embodiments, once a set of concepts is developed, the technology advantageously a) will constrain offers to only test "viable promotions", i.e., those that don't violate local laws, conflict with branding guidelines, lead to unprofitable concepts that wouldn't be practically relevant, can be executed on a retailers' system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as general population promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the general public, but value is delivered to the retailer or manufacturer because the offers are constrained to only include the best performing concepts. Deviation from the top concepts can be accomplished, but only once the specific changes are run through the testing process and emerge in the offer selection windows.

In an embodiment, it is expressly contemplated that the general population and/or subpopulations may be chosen from social media site (e.g., Facebook™, Twitter™, Google+™ etc.) participants. Social media offers a large population of active participants and often provide various communication tools (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

FIG. 2A shows, in accordance with an embodiment of the invention, a conceptual drawing of the forward-looking promotion optimization method. As shown in FIG. 2A, a plurality of test promotions 102a, 102b, 102c, 102d, and 102e are administered to purposefully segmented subpopulations 104a, 104b, 104c, 104d, and 104e respectively. As mentioned, each of the test promotions (102a-102e) may be designed to test one or more test promotion variables.

In the example of FIG. 2A, test promotions 102a-102d are shown testing three test promotion variables X, Y, and Z, which may represent for example the size of the packaging (e.g., 12 oz versus 16 oz), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as many or as few of the test promotion variables as desired. For example, test promotion 102e is shown testing four test promotion variables (X, Y, Z, and T).

One or more of the test promotion variables may vary from test promotion to test promotion. In the example of FIG. 2A, test promotion 102a involves test variable X1 (representing a given value or attribute for test variable X) while test promotion 102b involves test variable X2 (representing a different value or attribute for test variable X). A test promotion may vary, relative to another test promotion, one test promotion variable (as can be seen in the comparison between test promotions 102a and 102b) or many of the test promotion variables (as can be seen in the comparison between test promotions 102a and 102d). Also, there are no requirements that all test promotions must have the same number of test promotion variables (as can be seen in the comparison between test promotions 102a and 102e) although for the purpose of validating the effect of a single variable, it may be useful to keep the number and values of other variables (i.e., the control variables) relatively constant from test to test (as can be seen in the comparison between test promotions 102a and 102b).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations 104a-104d are shown segmented using four segmentation criteria A, B, C, D, which may represent for example the age of the consumer, the household income, the zip code, and whether the person is known from past purchasing behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations 104a-104d in the example of FIG. 2A, segmentation may involve as many or as few of the segmentation criteria as desired. For example, purposefully segmented subpopulation 104e is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation 104a involves segmentation criterion value A1 (representing a given attribute or range of attributes for segmentation criterion A) while purposefully segmented subpopulation 104c involves segmentation criterion value A2 (representing a different attribute or set of attributes for the same segmentation criterion A).

As can be seen, different purposefully segmented subpopulation may have different numbers of individuals. As an example, purposefully segmented subpopulation 104a has four individuals (P1-P4) whereas purposefully segmented subpopulation 104e has six individuals (P17-P22). A purposefully segmented subpopulation may differ from another purposefully segmented subpopulation in the value of a single segmentation criterion (as can be seen in the comparison between purposefully segmented subpopulation 104a and purposefully segmented subpopulation 104c wherein the attribute A changes from A1 to A2) or in the values of many segmentation criteria simultaneously (as can be seen in the comparison between purposefully segmented subpopulation 104a and purposefully segmented subpopulation 104d wherein the values for attributes A, B, C, and D are all different). Two purposefully segmented subpopulations may also be segmented identically (i.e., using the same segmentation criteria and the same values for those criteria) as can be seen in the comparison between purposefully segmented subpopulation 104a and purposefully segmented subpopulation 104b.

Also, there are no requirements that all purposefully segmented subpopulations must be segmented using the same number of segmentation criteria (as can be seen in the comparison between purposefully segmented subpopulation 104a and 104e wherein purposefully segmented subpopulation 104e is segmented using five criteria and purposefully segmented subpopulation 104a is segmented using only four criteria) although for the purpose of validating the effect of a single criterion, it may be useful to keep the number and values of other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations.

In one or more embodiments, the test promotions are administered to individual users in the purposefully segmented subpopulations in such a way that the responses of the individual users in that purposefully segmented subpopulation can be recorded for later analysis. As an example, an electronic coupon may be presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also be deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of −0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) by a general promotion generator software (160). As can be appreciated from this discussion sequence, the optimization is a forward-looking optimization in that the results from test promotions administered in advance to purposefully segmented subpopulations are employed to generate a general promotion to be released to the public at a later date.

In one or more embodiments, the correlations ascertained by analysis engine 132 may be employed to generate additional test promotions (arrows 172, 174, and 176) to administer to the same or a different set of purposefully segmented subpopulations. The iterative testing may be employed to verify the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, a large number of test promotions may be generated (also with highly granular test promotion variables) and a large number of combinations of test promotions/purposefully segmented subpopulations can be executed quickly and at a relatively low cost. The same number of promotions offered as general public promotions would have been prohibitively expensive to implement, and the large number of failed public promotions would have been costly for the manufacturers/retailers. In contrast, if a test promotion fails, the fact that the test promotion was offered to only a small number of consumers in one or more segmented subpopulations would limit the cost of failure. Thus, even if a large number of these test promotions "fail" to elicit the desired responses, the cost of conducting these small test promotions would still be quite small.

In an embodiment, it is envisioned that dozens, hundreds, or even thousands of these test promotions may be administered concurrently or staggered in time to the dozens, hundreds or thousands of segmented subpopulations. Further, the large number of test promotions executed (or iteratively executed) improves the statistical validity of the correlations ascertained by analysis engine. This is because the number of variations in test promotion variable values, subpopulation attributes, etc. can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a general public promotion created from these correlations would likely elicit the desired response from the general public. It would also, over, time, create promotional profiles for specific categories, brands, retailers, and individual shoppers where, e.g., shopper 1 prefers contests and shopper 2 prefers instant financial savings.

Figure 2B:
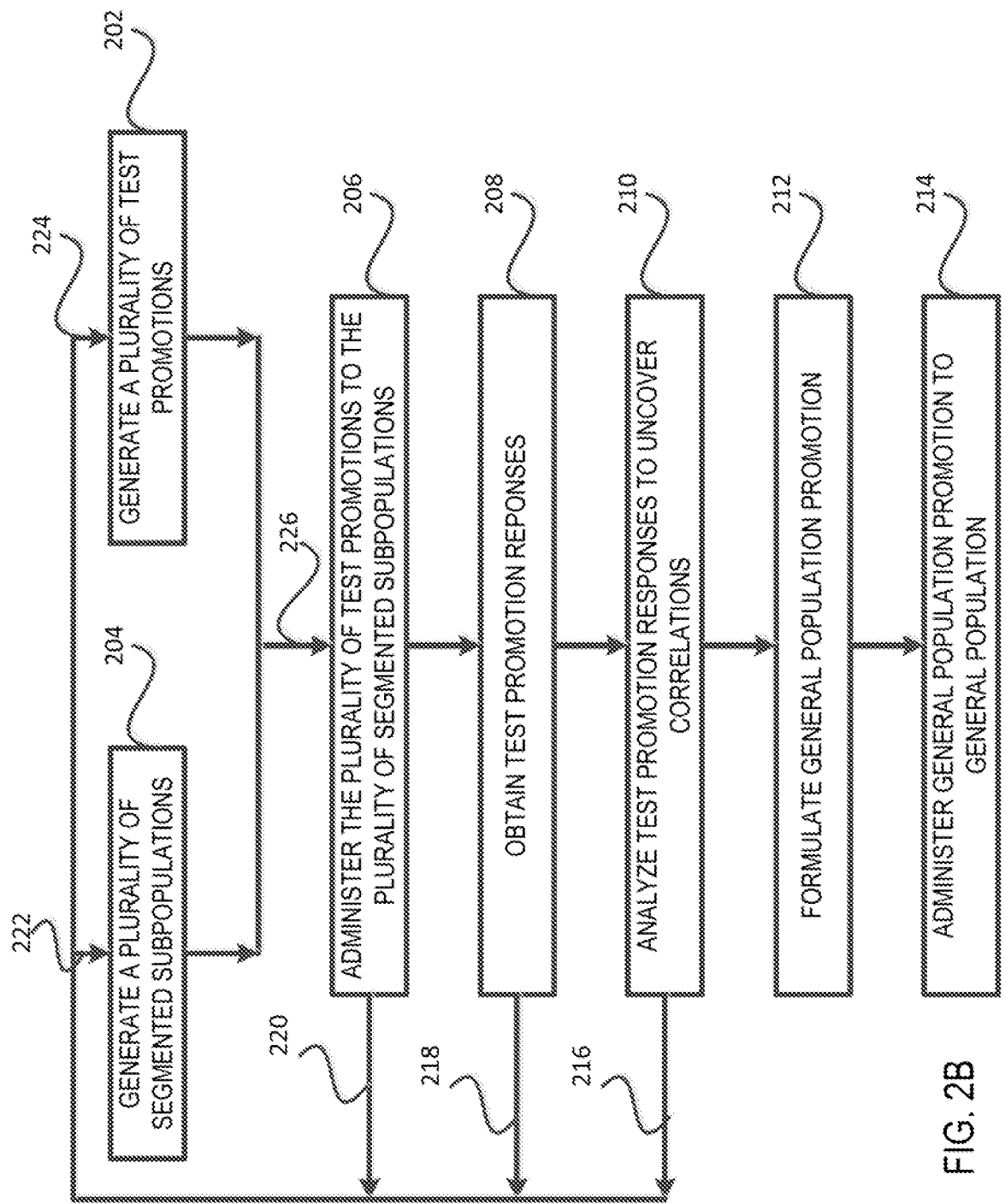
FIG. 2B shows, in accordance with an embodiment of the invention, the steps for generating a general public promotion.

FIG. 2B shows, in accordance with an embodiment of the invention, the steps for generating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses in an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented subpopulations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion is formulated from the correlation data, which is uncovered by the analysis engine from data obtained via subpopulation test promotions. In an embodiment, the general public promotion may be generated automatically using public promotion generation software which utilizes at least the test promotion variables and/or subpopulation segmentation criteria and/or test subject responses and/or the analysis provided by analysis engine 132.

In step 214, the general public promotion is released to the general public to promote the goods/services.

In one or more embodiments, promotion testing using the test promotions on the segmented subpopulations occurs in parallel to the release of a general public promotion and may continue in a continual fashion to validate correlation hypotheses and/or to derive new general public promotions based on the same or different analysis results. If iterative promotion testing involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
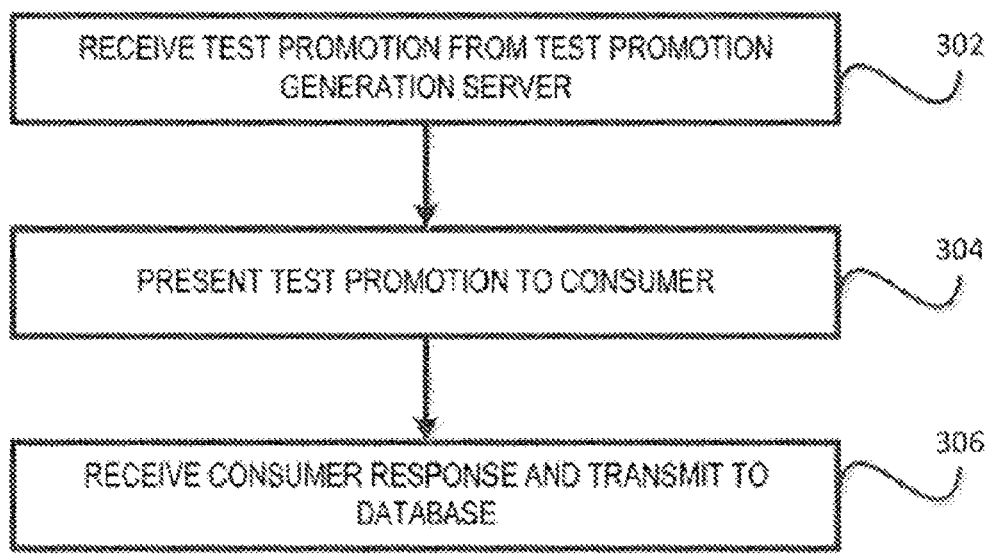
FIG. 3A shows in greater detail, in accordance with an embodiment of the invention, the administering step 206 of FIG. 2 from the user's perspective.

FIG. 3A shows in greater detail, in accordance with an embodiment of the invention, the administering step 206 of FIG. 2 from the user's perspective. In step 302, the test promotion is received from the test promotion generation server (which executes the software employed to generate the test promotion). As examples, the test promotion may be received at a user's smart phone or tablet (such as in the case of an electronic coupon or a discount code, along with the associated promotional information pertaining to the product, place of sale, time of sale, etc.) or in a computer-implemented account (such as a loyalty program account) associated with the user that is a member of the segmented subpopulation to be tested or via one or more social media sites. In step 304, the test promotion is presented to the user. In step 306, the user's response to the test promotion is obtained and transmitted to a database for analysis.

Figure 3B:
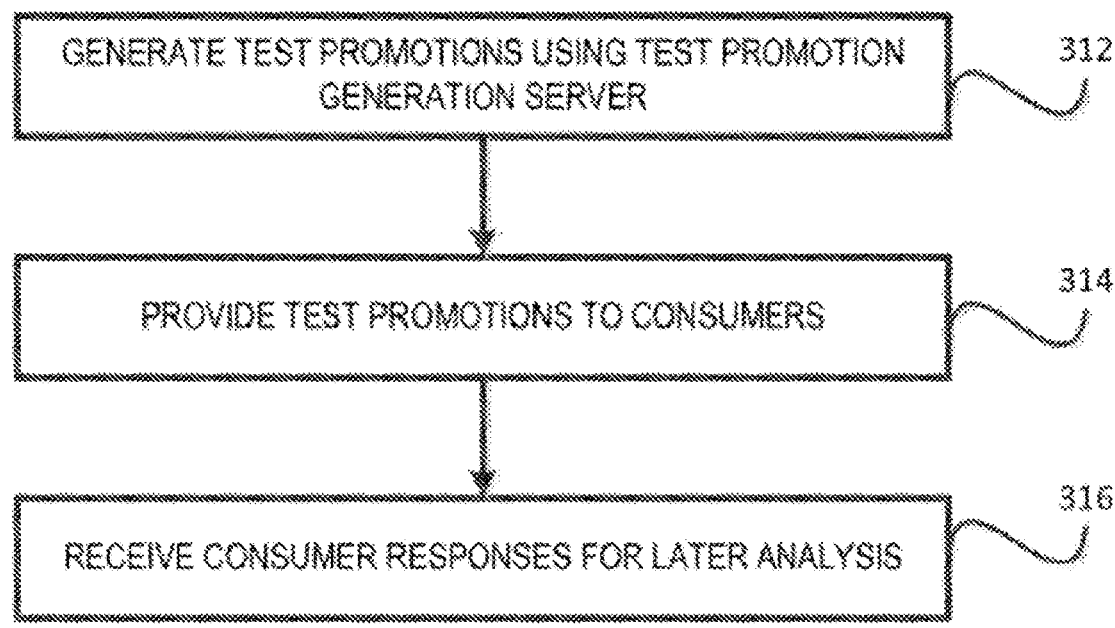
FIG. 3B shows in greater detail, in accordance with an embodiment of the invention, the administering step 206 of FIG. 2 from the forward-looking promotion optimization system perspective.

FIG. 3B shows in greater detail, in accordance with an embodiment of the invention, the administering step 206 of FIG. 2 from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer or shared with the user using the user's loyalty account). In step 316, the system receives the user's responses and stores the user's responses in the database for later analysis.

Figure 4:
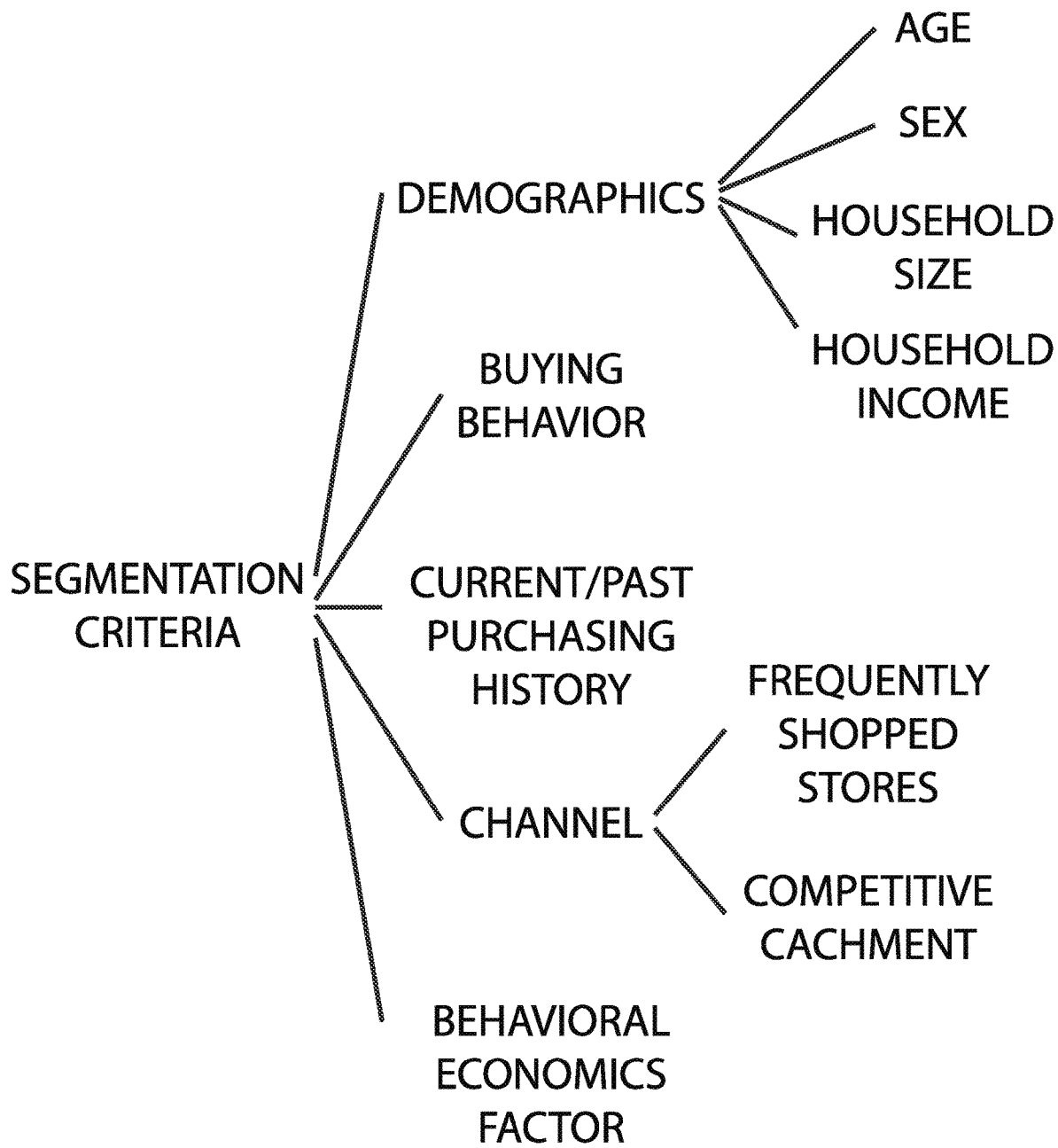
FIG. 4 shows various example segmentation criteria that may be employed to generate the purposefully segmented subpopulations.

FIG. 4 shows various example segmentation criteria that may be employed to generate the purposefully segmented subpopulations. As show in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance), behavioral economics factors, etc. can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
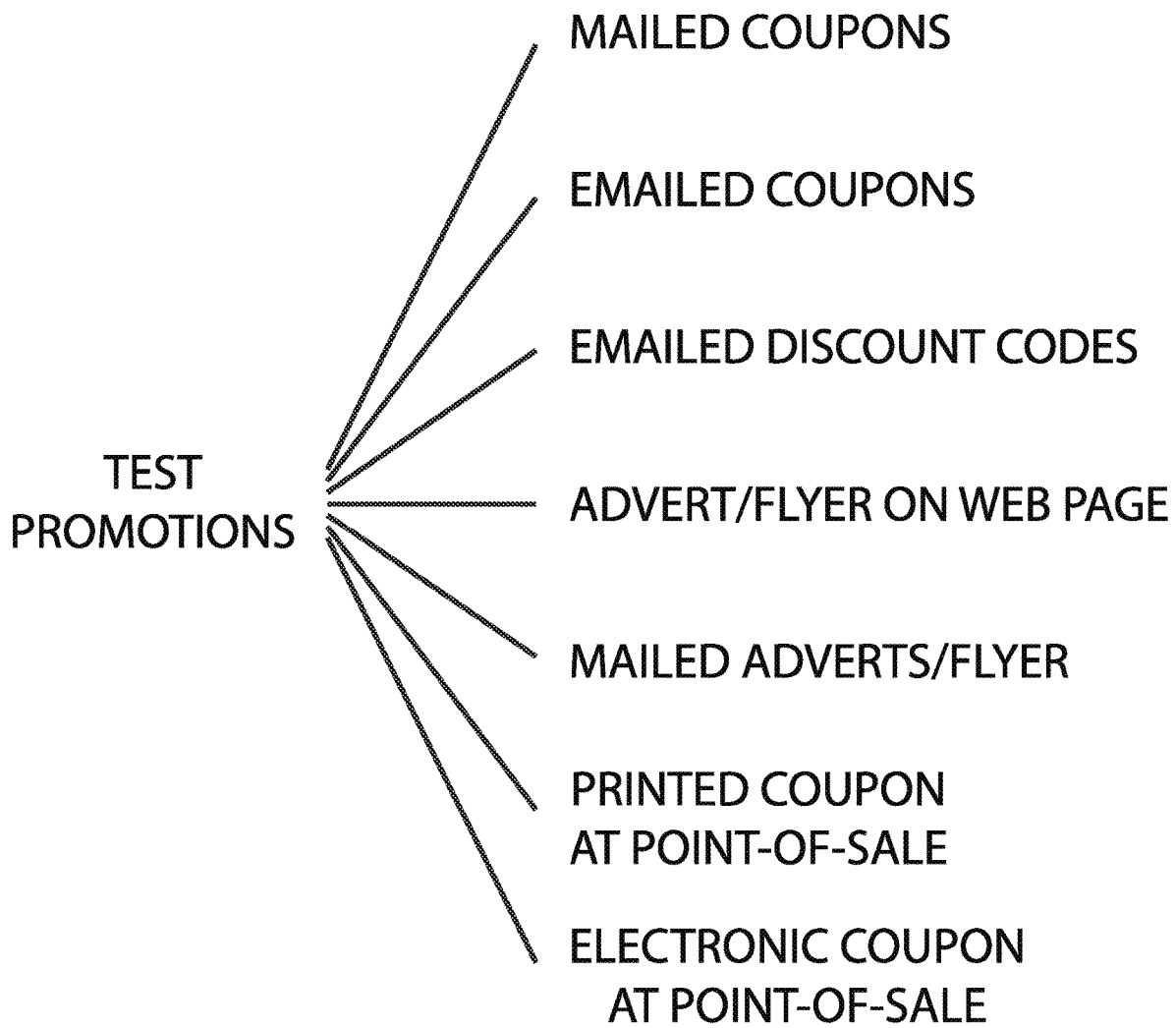
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
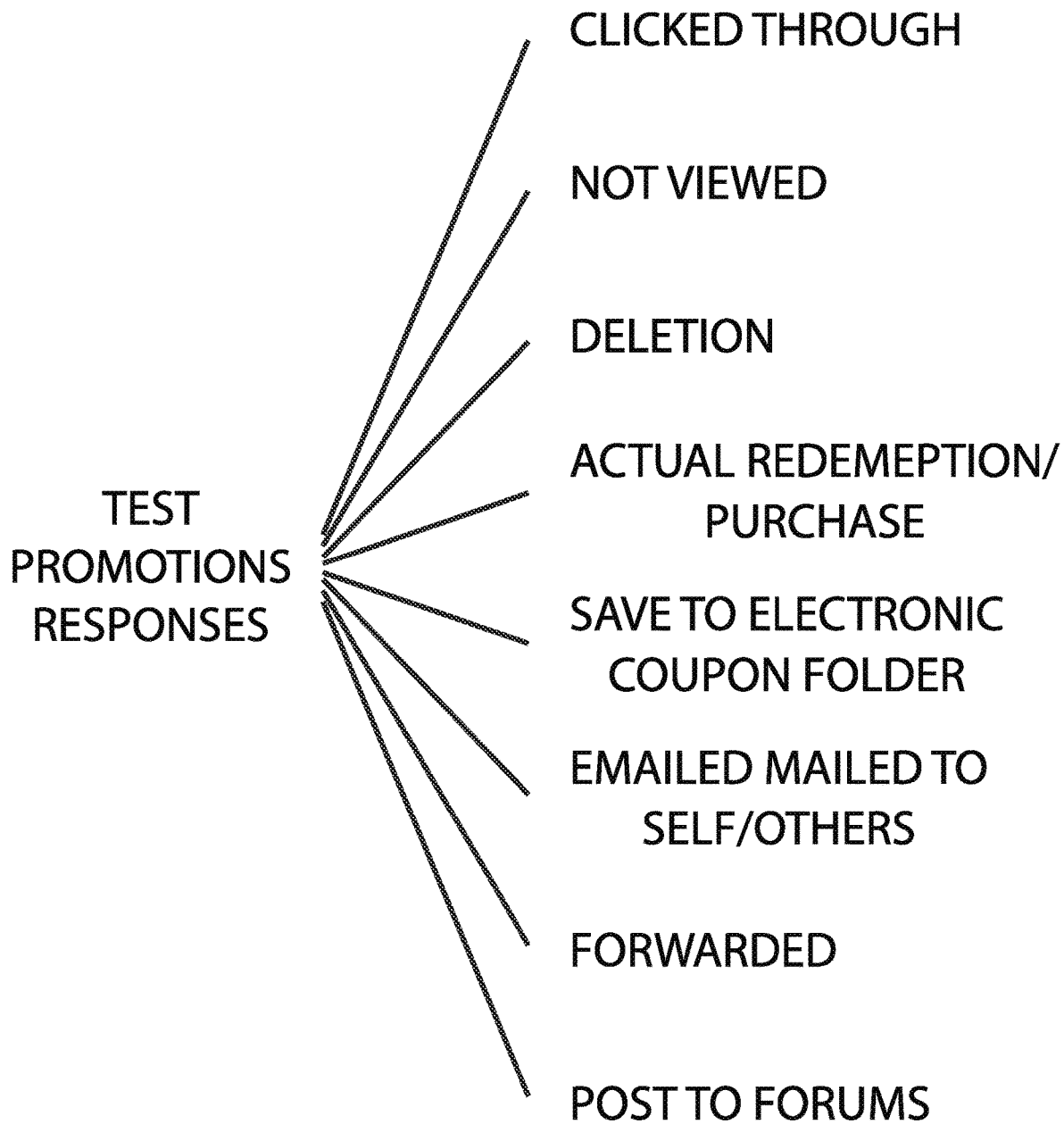
FIG. 6 shows, in accordance with some embodiments, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest). As mentioned, weights may be accorded to various consumer responses to allow the analysis engine to assign scores and provide user-interest data for use in formulating follow-up test promotions and/or in formulating the general public promotion. The examples of FIG. 6 are meant to be illustrative and not meant to be exhaustive or limiting.

Figure 7:
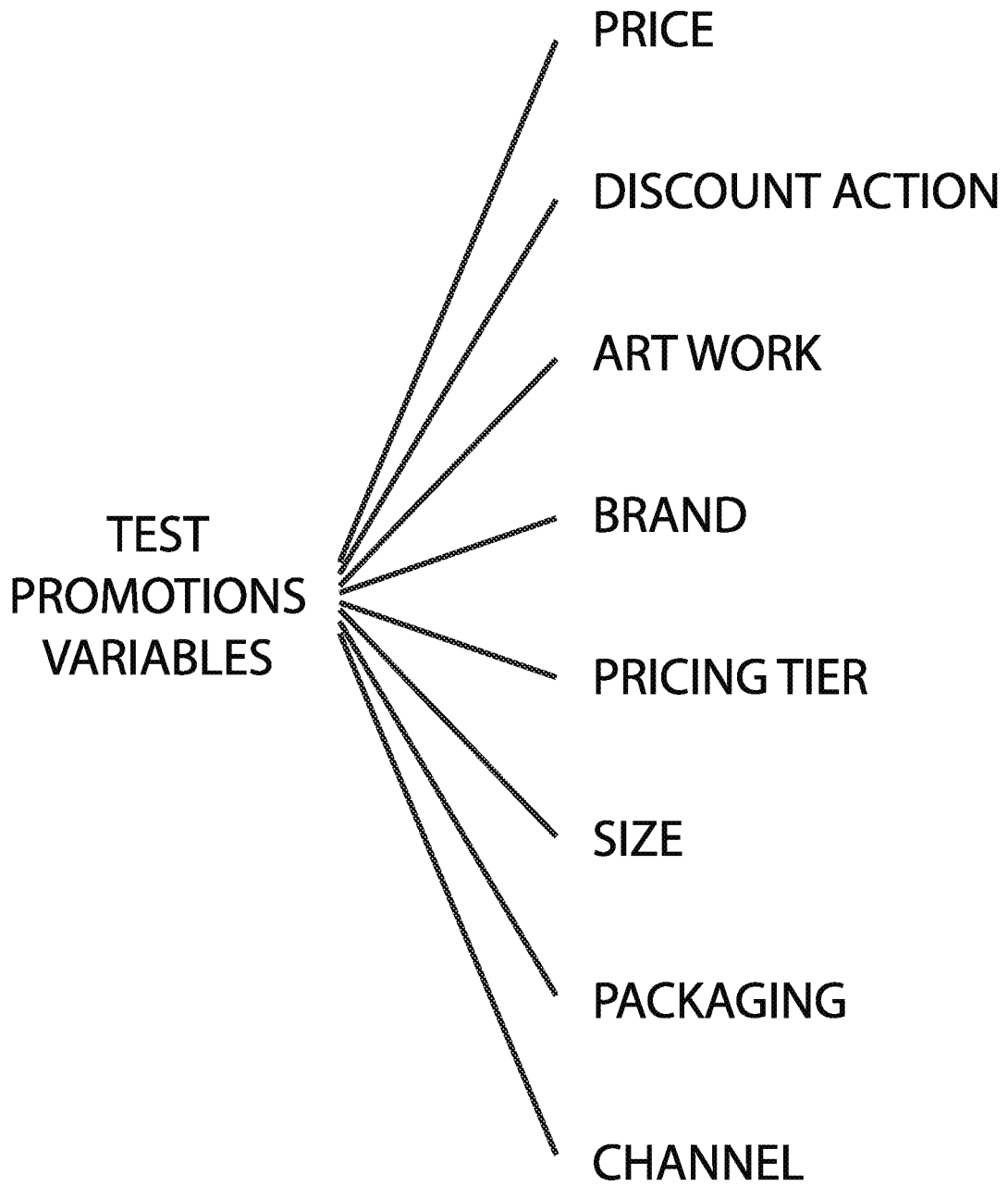
FIG. 7 shows, in accordance with some embodiments, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz, 16 oz, 8 oz), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
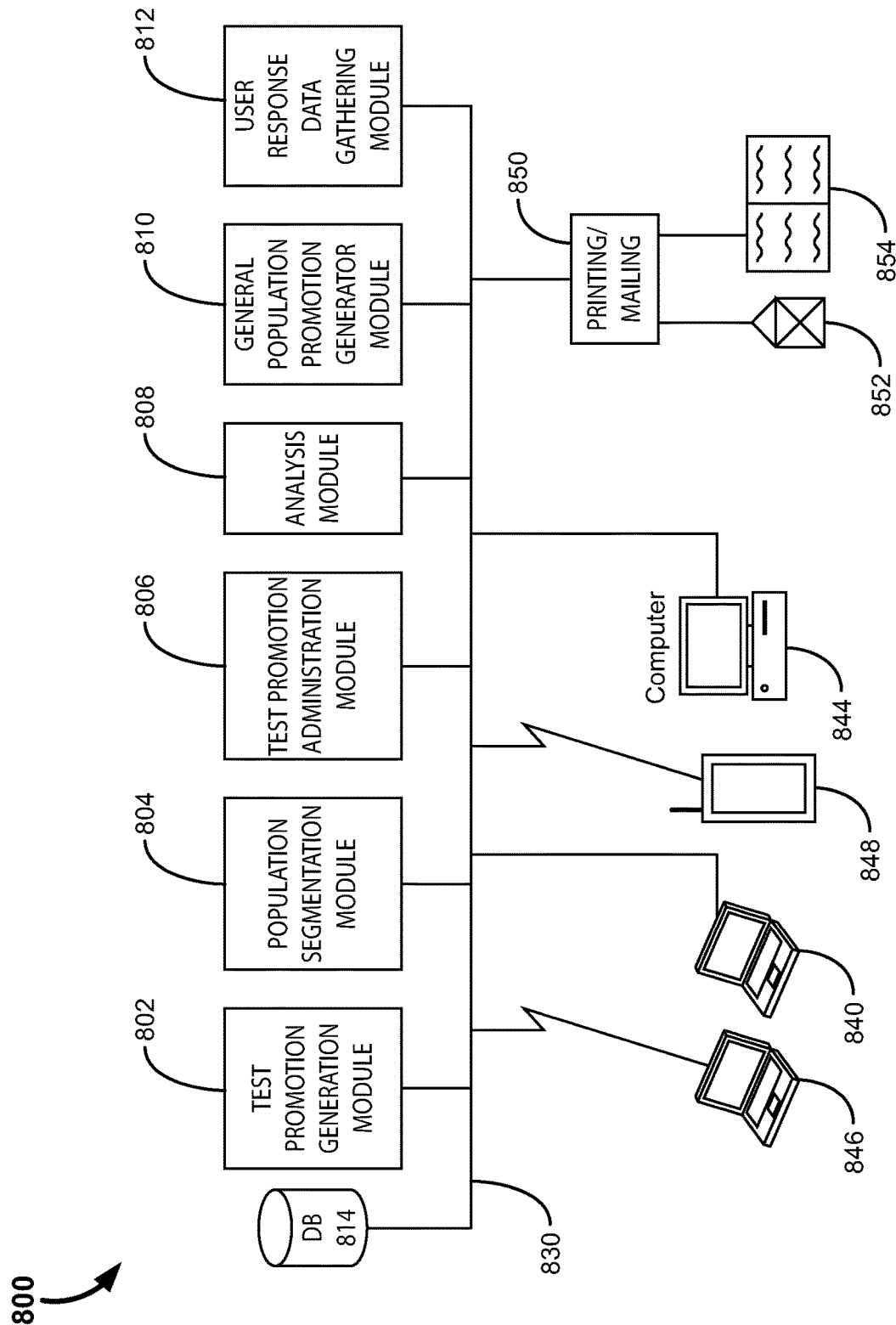
FIG. 8 shows, in accordance with some embodiments, a general hardware/network view of a forward-looking promotion optimization system.

FIG. 8 shows, in accordance with an embodiment of the invention, a general hardware/network view of the forward-looking promotion optimization system 800. In general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion using the analysis result of the data from the test promotions. There is also shown a module 812, representing the software/hardware module for receiving the responses. Module 812 may represent, for example, the point of sale terminal in a store, a shopping basket on an online shopping website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

As can be appreciated by those skilled in the art, providing a result-effective set of recommendations for a generalized public promotion is one of the more important tasks in test promotion optimization.

In one or more embodiments, there are provided adaptive experimentation and optimization processes for automated promotion testing. Testing is said to be automated when the test promotions are generated in the manner that is likely to produce the desired response consistent with the goal of the generalized public promotion.

For example, if the goal is to maximize profit for the sale of a certain newly created brand of potato chips, embodiments of the invention optimally and adaptively, without using required human intervention, plan the test promotions, iterate through the test promotions to test the test promotion variables in the most optimal way, learn and validate such that the most result-effective set of test promotions can be derived, and provide such result-effective set of test promotions as recommendations for generalized public promotion to achieve the goal of maximizing profit for the sale of the newly created brand of potato chips.

The term "without required human intervention" does not denote zero human intervention. The term however denotes that the adaptive experimentation and optimization processes for automated promotion testing can be executed without human intervention if desired. However, embodiments of the invention do not exclude the optional participation of humans, especially experts, in various phases of the adaptive experimentation and optimization processes for automated promotion testing if such participation is desired at various points to inject human intelligence or experience or timing or judgment in the adaptive experimentation and optimization processes for automated promotion testing process. Further, the term does not exclude the optional nonessential ancillary human activities that can otherwise also be automated (such as issuing the "run" command to begin generating test promotions or issuing the "send" command to send recommendations obtained).

II. Intelligent Promotion Design

Now that the broad concept of forward looking promotion optimization has been discussed in considerable detail, attention shall now be focused upon the ability to assist users, with the selection of promotions for an intelligent promotion experimental design. By designing promotional testing to be more efficient, lower testing costs are incurred, and the most effective promotions may be quickly zeroed in upon.

Figure 9:
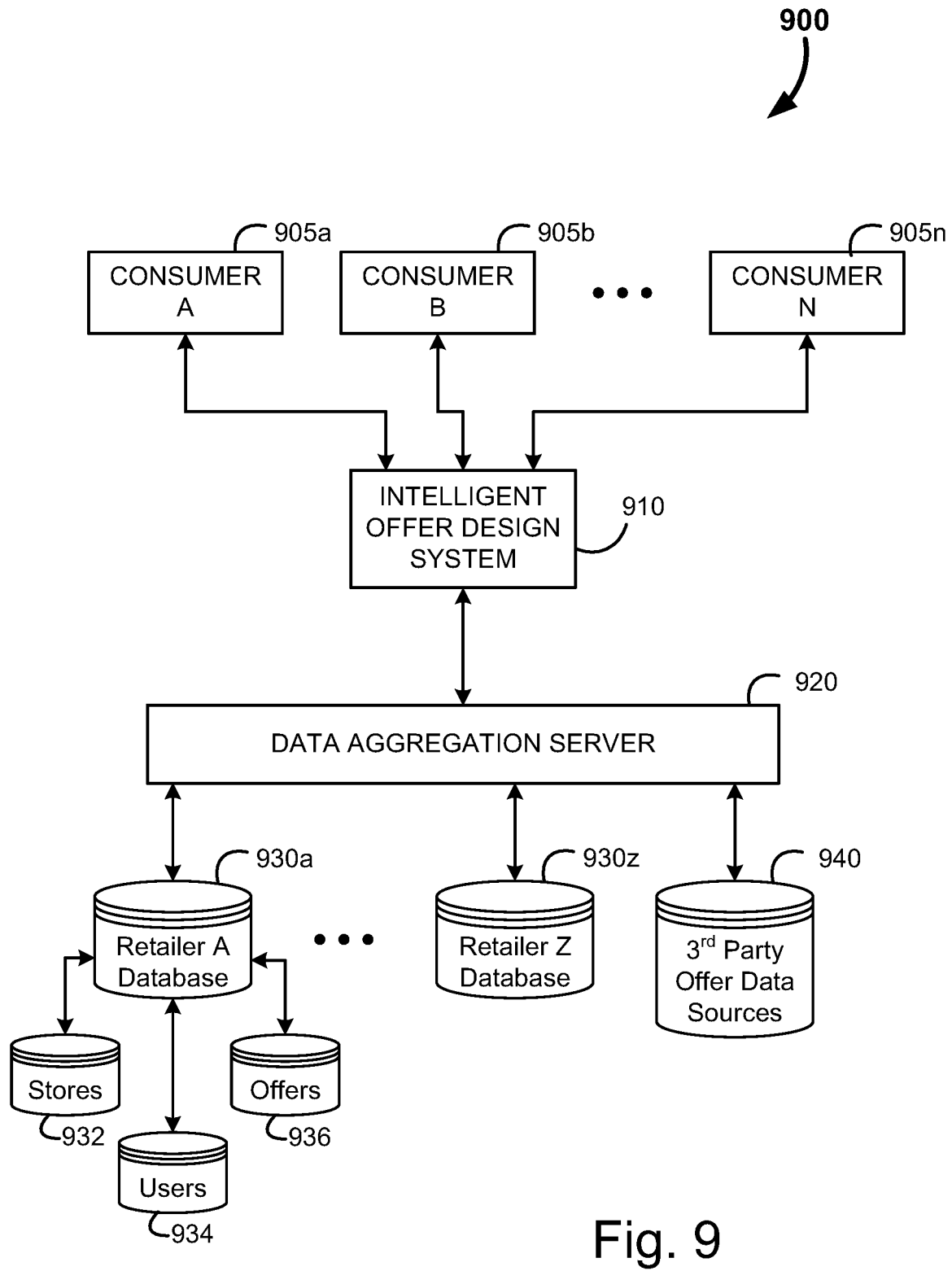
FIG. 9 shows, in accordance with some embodiments, a block diagram of an intelligent promotional design architecture.

In FIG. 9, example framework for the intelligent promotion design generation and administrations system 900 is provided. Of note, in this system the intelligent offer design system 910 interfaces with a server 920 that aggregates data collected from retailers 930a-z as well as other third party data sources 940. These third party data sources 940 may include web based platforms such as Facebook or other social media sites, email applications, or applications operating on mobile devices. Between the retailer data sources and the third party data sources, information regarding a user's redemption, opening, sharing or other activity related to a promotion may all be captured for offer efficacy analysis. This enables the intelligent offer design system 910, which couples to the data aggregation server 920, to leverage data from different data sources in order to effectively design and administer promotional offers. This results in a highly scalable, and effective promotion experimentation framework that enables concurrent experiments of multiple offers across a wide number of consumer segments, shown generally as consumers A-N at 905a-n respectively.

The intelligent offer design system 910 includes much of the same functional components as identified in FIG. 8. However, rather than printing and mailing the promotions, the present system includes APIs that allow the transmission and display of the offers to a wide context of consumers 905a-n. For example the promotions may consist of email, text messages, Facebook feeds (or other website based feeds), or within specialized applications the consumers 905a-n may leverage. For example, many consumers have applications related to a specific retailer or brand on their mobile devices. The intelligent offer design system 910 may have appropriate API that allow the offers to be populated within relevant applications in the mobile devices of the consumers.

The intelligent offer design system 910 relies upon retailer collected data 930a-b, as well as third party data 940 as noted above for the proper analysis of offer efficacy. As noted previously, third party data 940 may include data collected from other promotional platforms and offer streams. The retailers data 930a-b typically includes information relating to the stores 932 that belong to the retailer. This may include store inventories, location, operating hours, and other pertinent information. Likewise, user information 934 is included in the retailer data. User information typically includes user account information, and may also include data collected regarding the user's purchase history, location/date information, and any other profile data that has been offered or collected regarding the user (e.g., age, sex, income level, ethnicity, familial status, etc.). Lastly, the retailer data may include offer information 936 that has been previously tested and the results of the offers. This information is critical to the optimization of offers in order to hone in on the most effective promotions.

The intelligent offer design system 910, by its very nature, compiles vast amounts of information and therefore may include significant processing power, consisting of arrays of computer processors performing parallel computations. Likewise, given the vast data collected regarding historical offers, and possible new offer types, the intelligent offer design system 910 includes significant data storage. This may include multiple storage devices including hard drives and/or solid state drives. In some embodiments, tiers of storage are required to meet the storage requirements of the intelligent offer design system 910.

In some embodiments, the entire intelligent offer design system 910 may be centralized within one server device. However, given the computing demands involved in these methods, often a distributed computing environment is required to complete the desired offer design and administration. Particularly, often the activities of intelligent promotion design is performed in one computing device (or cluster of devices) while the administration of promotions is relegated to a separate computing system. In yet other embodiments, a third computing system, in communication with the other systems, performs the analysis and modeling of promotional efficacy upon receipt of information from the retailers and other third part data sources.

Figure 10:
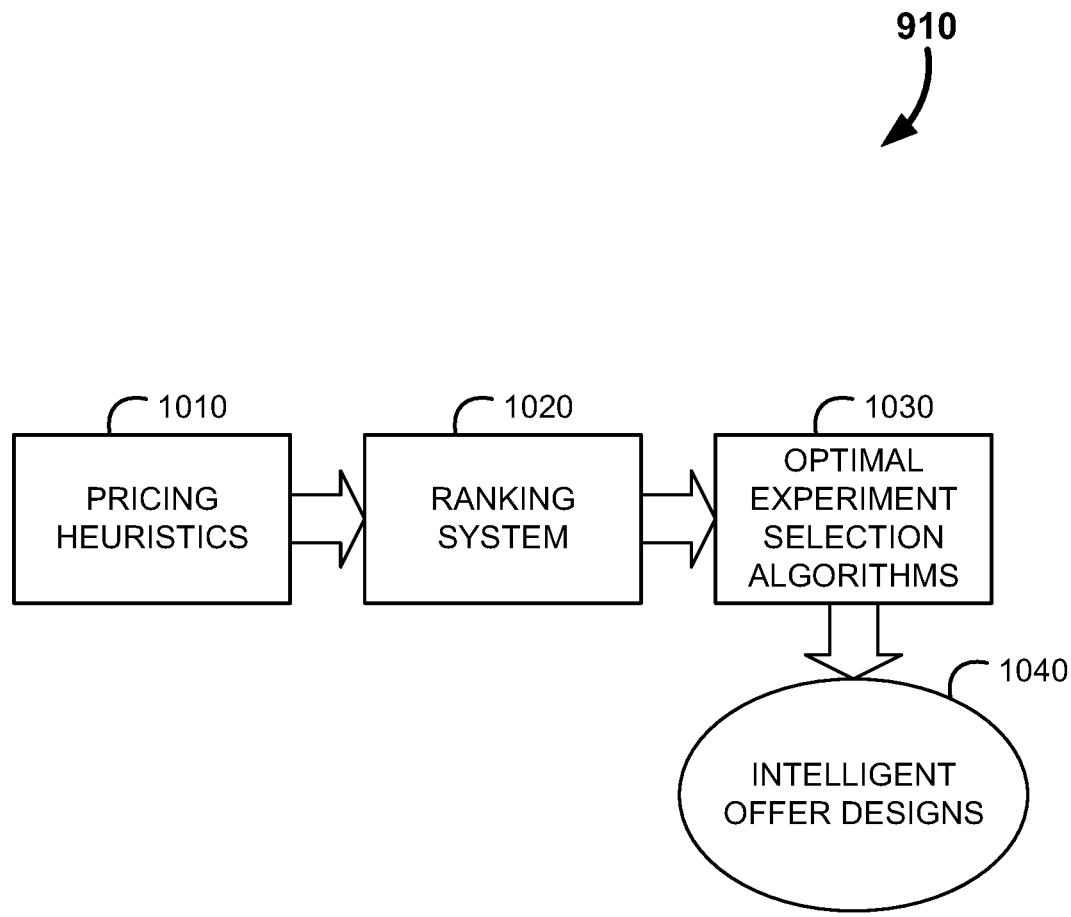
FIG. 10 shows, in accordance with some embodiments, an example block diagram of the intelligent offer design system.

FIG. 10 shows, in accordance with some embodiments, an example block diagram of the intelligent offer design system 910 in terms of its logical processes. As noted above, even within this process of designing promotions for effective experimentation, the separate stages may be completed in a central computing system, or may be handles by more specialized and discrete computing systems. For example, the pricing heuristic system 1010 may be less computationally extensive than the ranking system, in some embodiments, but may require vast storage capacity based upon the very large numbers of variable values considered. The ranking system 1020, in contrast, may be required to undergo complex and lengthy computations on a reduced dataset provided from the heuristic system 1010, and thus require more available random access memory and processing power, yet lower overall storage capacity.

The pricing heuristics system 1010 generates a listing of all available variables and the possible values, within user defined limits. This listing of variable values is then subjected to a pruning process whereby user inputted constraints, and/or constraints derived from a retailer's business goals, brand requirements, rounding rules, or the like, are applied. This results in a paired down set of variable values combinations that explores the entire design space of possible offers that do not run afoul of a rule constraint.

This listing of all possible variable values combinations forming offers that do not infringe upon the applied rules are then provided to the ranking system 1020 that applies trained models on to rank the top X percentage of the offer combinations. Typically the top 10-20% of offers is selected. In alternate embodiments the system is configured to select out the top 4 or 5 offers from the available combinations.

The models employed utilize machine learning to select the top offers. Historical data from retailers and third party data is utilized to train the models. These models are continually updated as additional data is collected. As noted, different activity by a user may be weighted differently in the determination of which promotions are most effective. This includes weighting redemption rates, shares, downloads, and views of a given offer differently. It should be understood that any suitable model for ranking the offers could be employed; however, one example of a means for scoring the offers will be discussed in detail further below.

All offer combinations that are not selected as the top offers remain eligible for inclusion in the promotional experiment design, and an additional subset of offers are selected by the optimal experimental selection algorithms 1030 to maximize particular criteria, as will be discussed in further detail below. The top offers, and the selected subset of offers are then aggregated as a set of offers 1040 for presentation to the consumer for forward looking experimentation as already covered in detail above. This promotion experimentation utilizes concurrent and staggered small tests of particular offers against various consumer subsets in order to explore the incremental impact each variable value combination, and sets of variable values, have on the overall performance of the offer. In this manner, the most effective combination of variable values may be identified, for a given consumer subpopulation, and the general promotion may be administered to a wider distribution than any of the test promotions.

The process of generating an intelligent promotional design, as described in broad terms above, shall now be explored in greater detail. As noted, a given promotion may include a given set of variables, each of which may include many possible values (referred to as a variable value pair). A set of variable value pairs together defines a given promotion. The variables may be user defined, or may be intrinsic to a given promotion template and/or brand of product. For example, an email promotion template for a brand of potato chips may include the following variables: package size, image, offer type, percentage discount, background color, lettering font, lettering size and quantity, for example. FIG. 11A illustrates how a table of each variable value combination may be compiled to provide the entire design space for a given promotion, shown generally at 1100A. This listing of all possible combinations may be infinite if not initially limited in some basic ways. For example the system may enforce that the discounts have a minimal value of 0% and only be incremented at a 10% interval. Further, the brand may include some initial constraints, such as the maximum discount is 40%. Thus, for this variable "discount" the total values are 10%, 20%, 30% and 40%. Likewise, it is possible that only certain fonts, font sizes, colors and images are available.

However, even at only 3 or 4 values possible for a given variable, in an offer that contemplates 6 different variables it is possible to have a total of 729-4096 combinations of possible offers. Having more variables or values rapidly increases the possible numbers of possible offers. For this reason, for the sake of clarity the following examples will be limited to only three variables with two, four and three possible values, respectively. A variable value tables showing these possible combinations of offers is provided at 1100B of FIG. 11B. Given this relatively limited variable value set, a manageable 24 possible combinations are possible.

Next additional user constraints and rounding rules are applied to the variable value combinations in order to limit the number of possible offers further. These constraints may be user defined, such as "do not combine a dollar off type promotion with a 40% off discount depth." Additionally the rounding rules ensure the discount type and depth results in acceptable values. For example, if the percentage off and discount type results in a price that is not within a given percentage of an approved price format, then the combination of variable values may be removed from the listing of viable combinations. For example, the rules may state that any discount must be within three cents of a half dollar denomination, and when applied, the price listed in the promotion is rounded to that half dollar amount. In such an example, a widget costing $5.75 normally would be $4.60 at a 20% discount, and $4.03 at a 30% discount. The rounding rules may disqualify the 20% discount since the promotional price does not fit into an acceptable dollar amount, whereas the 30% off offer may be kept, and rounded to a price of $4 per widget, in this limited example. Other examples of heuristic rules may prevent high discounts at high buy quantities, or similar rules. Overall, the rounding rules applied may be directed toward the goals of increasing total sales, household penetration, increased sales at the same price point, or increased margin.

If increase in total sales is the selected goal, the heuristic rule applied may include incremental deep discounts above a control level. If the selected goal is household penetration, then the rules applied may overweight low quantity offers but not high quantity offers. Increased sales at a fixed price point may impose rules which limit the discount and only vary other variables such as quantity, and offer structure. An increased margin goal may be accompanied by heuristic rules that have incremental price increases based upon upper and lower bounds.

In some embodiments, the above heuristic rules may be predefined within the system, and the user merely is required to input their desired goal from a drop down menu, radial button selection or the like. Upon goal selection, the system may automatically apply the stored rules to the variable value combinations in order to eliminate particular offers. In alternate embodiments, the consumer space involved may be utilized to define the goals. For example if the product selected is a household consumable good, the system may default to a heuristic rule that overweight low quantity offers but not high quantity offers without any additional user intervention. In contrast, newly introduced products may be subject to incremental deep discounts above a control level, again without any user input.

The final results of the application of rounding rules and heuristic rules is the elimination of some subset of the offers, as may be seen at 1100C of FIG. 11C. In this example, the rule applied does not allow for variable C having its second value. These eliminated offers are shaded in this example illustration. All remaining sixteen viable offer combinations are then extracted an numbered accordingly, as may be seen at 1200A of FIG. 12A. This offer listing is then subjected to scoring and ranking. The tope percentage or number of the offers based upon this scoring are then identified, as seen in 1200B of FIG. 12B. The number or percentage of offers selected as "the top offers" may be user configured, or may be predefined. In some systems the top 20% of offers or the top 4 or 5 offers are selected. In this particular example, four offers are determined to be the top offers: offer 3, 5, 12 and 13.

The scoring of offers may be computationally intensive, in some embodiments. The scoring of the offers utilizes machine learning, as discussed above. It starts with a training set of offers for which measured efficacy rates have been collected. FIG. 13 provides an example table of four such training set of offers for illustrative purposes, shown generally at 1300.

In this scoring system the training offers are identified in the first column by a designator. The next three columns show the relevant values for each variable used in the training set. Again, note that these examples training set offers only have three variables for the sake of simplicity and understanding. In a real-world computation many more variables with many values could be considered. The results of the variable values are then coded into a matrix, as shown in the subsequent three columns. In this abstraction, variable A, B and C's first value is given a designation of 0, and the second value is a 1. This defines a vector for the variables of the given test offer (e.g., test offer 1 has a vector of [0,0,1], whereas offer 2 has a vector of [0,1,0]). In general, categorical variables are transformed into $k_i$ binary vector of columns for every i through N number of variables. For example, assume that in FIG. 13 there also was a variable D which has four total values representing four different offer types, (e.g., {Percent Off, DollarOff, BOGO, Total Price}) indicating the offer type of each offer 1 thru 4 respectively. The binary representation would break out this single 4-valued column into 4 columns represented by the following: D-PercentOff={1,0,0,0}, D-DollarOff={0,1,0,0}, D-BOGO={0,0,1,0} and D-TotalPrice={0,0,0,1}.

The following column is a measured metric of offer success. In this example this is the klip rate. Klip rate is the rate of clipping of the offer on the website 'Klip'em', but may be abstracted to be the rate an offer is selected/downloaded or saved on any promotional platform. This clip rate is the number of 'clips' divided by the number of impressions of the offer. Clips may be the number of 'clicks' on the digital offer and impressions are the number of views consumers made of the offer. In alternate embodiments, the metric used to measure offer success may be redemption rate, shares, saves, views, or an amalgamation of any of these metrics. For example, in some embodiments, and of these activities may be measured and a weighted average taken in order to determine a final efficacy score. For example a redemption may be weighted heavily, while a saving or sharing given significant weight as well (possibly half the weight of a redemption), whereas simply viewing the promotion would only contribute slightly to the metric of offer success. In addition to the klip rate measured in this example an impression score is likewise compiled. Impressions simply normalizes the klip signal measurement into klip rate (or clip rate)—a value ranging from 0 to 1. Alternatively a composite score may be generated which includes the number of 'likes', posts, shares and klips which would individually be normalized by impressions and then tuned by individual weighting constants.

From the table compiled in FIG. 13 for the training offers, a derivative table of pair-wise offer comparisons is made, as seen at 1400 of FIG. 14. The pairs are given a designation (pair ID) in the first column. All of the training offers are paired in the manner shown in the second column. The variable vectors of the pairs are then subtracted from one another to provide differential values, as seen in the following three columns. For example, for the pair ID 1, the pair is test offer 2 being subtracted from test offer 1 (1-2). As noted above the vector for test offer 1 is [0,0,1]. The vector for test offer 2 is [0,1,0] Thus, pair 1-2 is [0,0,1]-[0,1,0]= [0,-1,1]. This is performed for every offer pair combination. The next four columns in this derived table indicate which offer is being added or subtracted in the pair for reference purposes. Again, for pair ID 1, offer 1 is being included (therefore is given a value of 1) and offer 2 is being subtracted from offer 1 (therefore has a value of −1). Offer 3 and 4 are not in this pair (therefore their values are 0).

The delta and normalized score are the final two columns of this derivative table shown in FIG. 14. The delta is merely a subtraction of the klip rates between the pair combination. The normalized score is a scaling of this delta based on a normalized test statistic=delta/$SE_{delta}$, where $SE_{delta}$=((kliprate$_2$*(1−kliprate$_2$)/impressions$_2$)+(kliprate$_1$*(1−kliprate$_1$)/impressions$_1$))$^{0.5}$, where delta=kliprate$_2$−kliprate$_1$.

Using the normalized score, a model may be generated via machine learning. This model may either be as a decision tree or a perceptron neural network model based upon the scale of the data involved. Decision tree and neural network algorithm are known, and may be employed in the generation of the model. Generally, for the data originating from a single client (brand or retailer) the relatively small scale of data is conducive to utilization of a decision tree model, whereas when the information from multiple clients are being aggregated a neural network model is more effective. FIG. 15 provides an example of a where the test offers are transformed back into the original set using the generated model via an ordinary least squares method or other linear regression technique, as seen at 1500. In this table the coefficients are relative to the test offer 4. The estimate values and/or t-value may be utilized as the score for the offer. Likewise, all offers identified in the table of FIG. 12A may each be scored according to the variable values of the offer in light of the model, and ranked relative to their resulting score. In this manner the top offers may be identified for usage in the promotional experiments.

Subsequently, the offers that were not designated as the "top" offers may be further analyzed in order to select an additional set of offers to "flesh out" the offer set for promotional experimentation. FIG. 16 provides the example list of offers with the 'top' offers shaded (as they are already part of the promotional experimental design, and an additional four offers selected to round out the promotional design, as seen at 1600. In this example, all offers are considered as candidates for selection for addition to the promotions design; however in situations where there are many offers available (due to more variables, more values for the variables, or less pruning during the heuristic step), potentially only a subset of the total offers may be available for consideration to be selected to the promotion experiment design.

For example, in some embodiments only the top 20 or 30 offers, as determined during the ranking step, may be considered for selection. In these examples, the top 4 (or 20%) of offers are added to the promotion design set, and the offers ranks 5-25 may be available for selecting the other 4 promotions to add to the promotion experimental design. Of course the above numbers are purely illustrative for this example, it is entirely possible that 10, 20 or more offers may be desired to be included in the promotion design. In such cases it is entirely possible to select 4-15 'top' promotions and an additional 4-20 other promotions from the remaining list of available promotions.

While it is entirely possible that the remaining offers that are selected after ranking the promotions is performed in a randomized manner, in some embodiments the remaining promotions are selected very purposefully in order to maximize particular criteria. These criteria enables the most effective experimental design during the test/discovery phase of the promotion rollout. Looking again at FIG. 16, the four selected promotions are chosen to optimize the following criteria: 1) equal number of each value is selected, and 2) maximization of orthogonality between the selected variable value combinations of the selected offers.

In FIG. 16, the four offers selected have the following variable value vectors: [A1, B1, C1], [A1, B3, C3], [A2, B2, C1], and [A2, B4, C3]. In this example, A1 is present in the same frequency as A2. Likewise B1, B2, B3 and B4 are each present once; and C1 and C3 are equally present. Thus, number of instance of each variable value combination is equal. Likewise, there is perfect orthogonality in this present example; no variable value combination is repeated between the various selected offers.

Figure 17A:
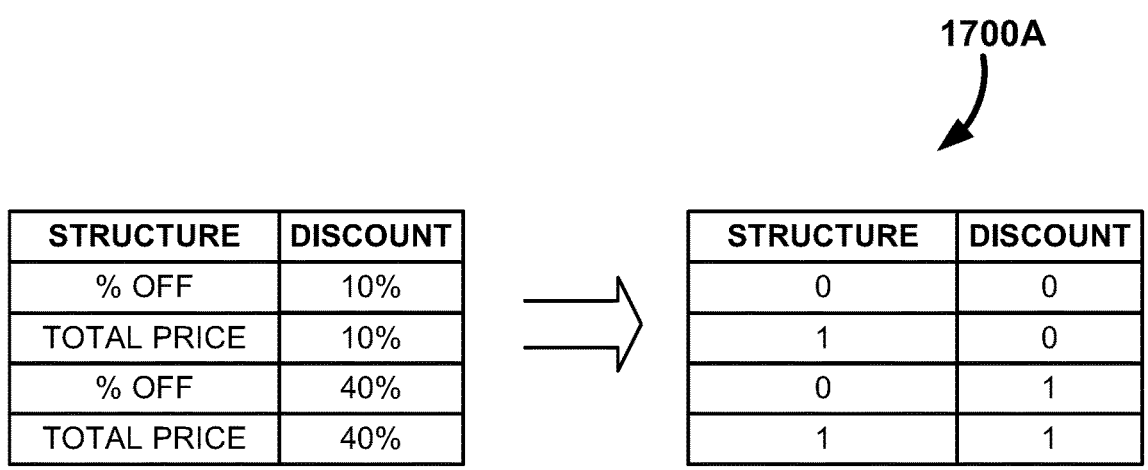
FIGS. 17A and 17B show, in accordance with some embodiments, examples of "optimal" promotion selections versus "non-optimal" promotion selections.
Figure 17B:
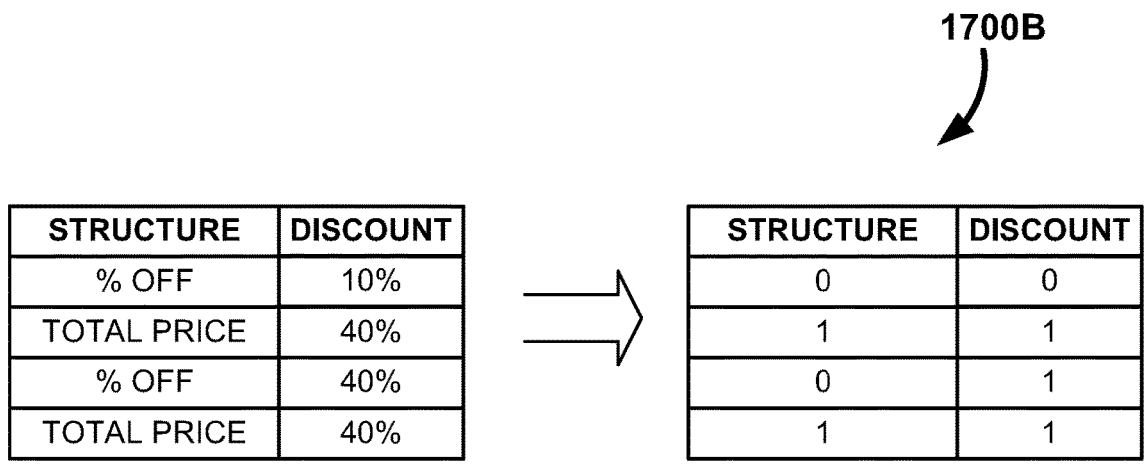

FIGS. 17A and 17B provide examples of how to calculate this orthogonality in order to illustrate a "good" selection of offers (maximized orthogonality) versus a less-optimal offer selection with lower orthogonality, respectively. In FIG. 17A an example of four offers with only two variables and two values per variable is provided, seen generally at 1700A. These offers are abstracted into vectors, as previously discussed, and the set of offers are combined to form a matrix of values given by:

$$X = \begin{bmatrix} 0 & 0 \\ 1 & 0 \\ 0 & 1 \\ 1 & 1 \end{bmatrix}$$

The optimization seeks to minimize $(X^T X)^{-1}$ or equivalently maximize determinant of $X^T X$. Thus we find:

$$X^T X = \begin{bmatrix} 0 & 1 & 0 & 1 \\ 0 & 1 & 1 & 1 \end{bmatrix} \begin{bmatrix} 0 & 0 \\ 1 & 1 \\ 0 & 1 \\ 1 & 1 \end{bmatrix} = \begin{bmatrix} 2 & 1 \\ 1 & 2 \end{bmatrix}$$

$$(X^T X)^{-1} = \frac{1}{\det(X^T X)} \begin{bmatrix} 2 & -1 \\ -1 & 2 \end{bmatrix}$$

$$= \frac{1}{3} \begin{bmatrix} 3 & -1 \\ -1 & 2 \end{bmatrix}$$

Therefore we have a determinant of 3. Thus the covariance is found by:

$$\operatorname{cov}(b) = s^2 (X^T X)^{-1}$$

$$= s^2 \frac{1}{3} \begin{bmatrix} 2 & -1 \\ -1 & 2 \end{bmatrix}$$

In contrast for FIG. 17B, the following matrix is found:

$$X = \begin{bmatrix} 0 & 0 \\ 1 & 0 \\ 0 & 1 \\ 1 & 1 \end{bmatrix}$$

Therefore:

$$X^T X = \begin{bmatrix} 0 & 1 & 0 & 1 \\ 0 & 1 & 1 & 1 \end{bmatrix} \begin{bmatrix} 0 & 0 \\ 1 & 1 \\ 0 & 1 \\ 1 & 1 \end{bmatrix} = \begin{bmatrix} 2 & 2 \\ 2 & 3 \end{bmatrix}$$

$$(X^T X)^{-1} = \frac{1}{\det(X^T X)} \begin{bmatrix} 3 & -2 \\ -2 & 2 \end{bmatrix}$$

$$= \frac{1}{(3 \times 2) - (2 \times 2)} \begin{bmatrix} 3 & -2 \\ -2 & 2 \end{bmatrix}$$

$$= \frac{1}{2} \begin{bmatrix} 3 & -2 \\ -2 & 2 \end{bmatrix}$$

This results in a determinant of 2, and the covariance is found by:

$$\text{cov}(b) = s^2 (X^T X)^{-1}$$

$$= s^2 \frac{1}{2} \begin{bmatrix} 3 & -2 \\ -2 & 2 \end{bmatrix}$$

Thus it can be seen that by maximizing the determinant of a given set of offers, the covariance of the betas are minimized. This results in a reduction of variance. Smaller covariances yield the ability to isolate the statistical significance of the betas of the factors, which for this example is offer structure and discount. In this manner the selection of offers may be optimized in a manner that allows for the best experimental design.

Figure 18:
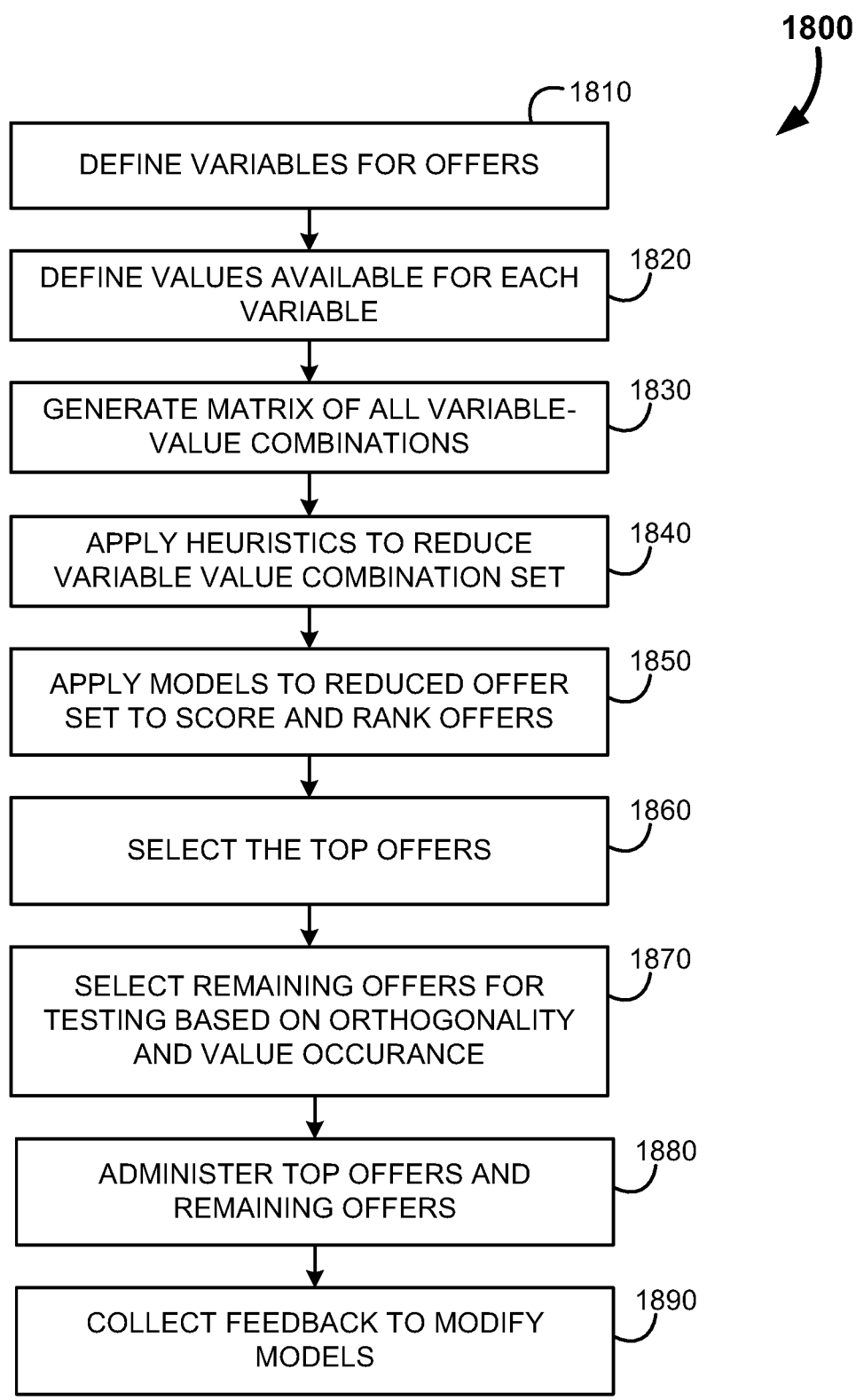
FIG. 18 shows, in accordance with some embodiments, a flowchart of an example method for the generation and application of intelligent promotional designs.

Lastly, FIG. 18 shows, in accordance with some embodiments, a flowchart 1800 of an example method for the generation and application of intelligent promotional designs. As discussed, initially the variables for the promotional campaign are selected, at 1810. This selection process may be facilitated through a promotion design wizard or other user friendly application. In some embodiments templates for promotions may be selected by the user and the variables associated with the template may be utilized.

The values for each of the variables are next defined, at 1820. Again, the system may include preset rules relating to upper and lower bounds, increment levels, or other selections. Other value constraints may be incorporated based upon the brands being promoted, channel of promotion or template choices. The user may likewise define basic constraints to limit the overall number of possible combinations.

Next a matrix or table of all variable value combinations for all the offers is generated, at 1830. This table may resemble that as seen in FIG. 11B. Heuristics may then be applied to the offer matrix to eliminate some of the offer combinations, at 1840. These heuristics may include user generated rules, or may include preset rules that comport to a given business goal selected by the user. In yet other embodiments, the heuristics applied may be dependent upon the product being promoted, the consumer base being targeted, lifecycle of the product, external business climate/economic factors, time of the year (e.g., pre-Black Friday promotions), or similar factors. Additionally rounding rules may be employed to avoid promotions that contain strange pricing structures or values. This results in a further reduced set of possible promotions combinations (although in many situations this still may include multiple dozens or even hundreds of possible offer combinations).

Figure 19:
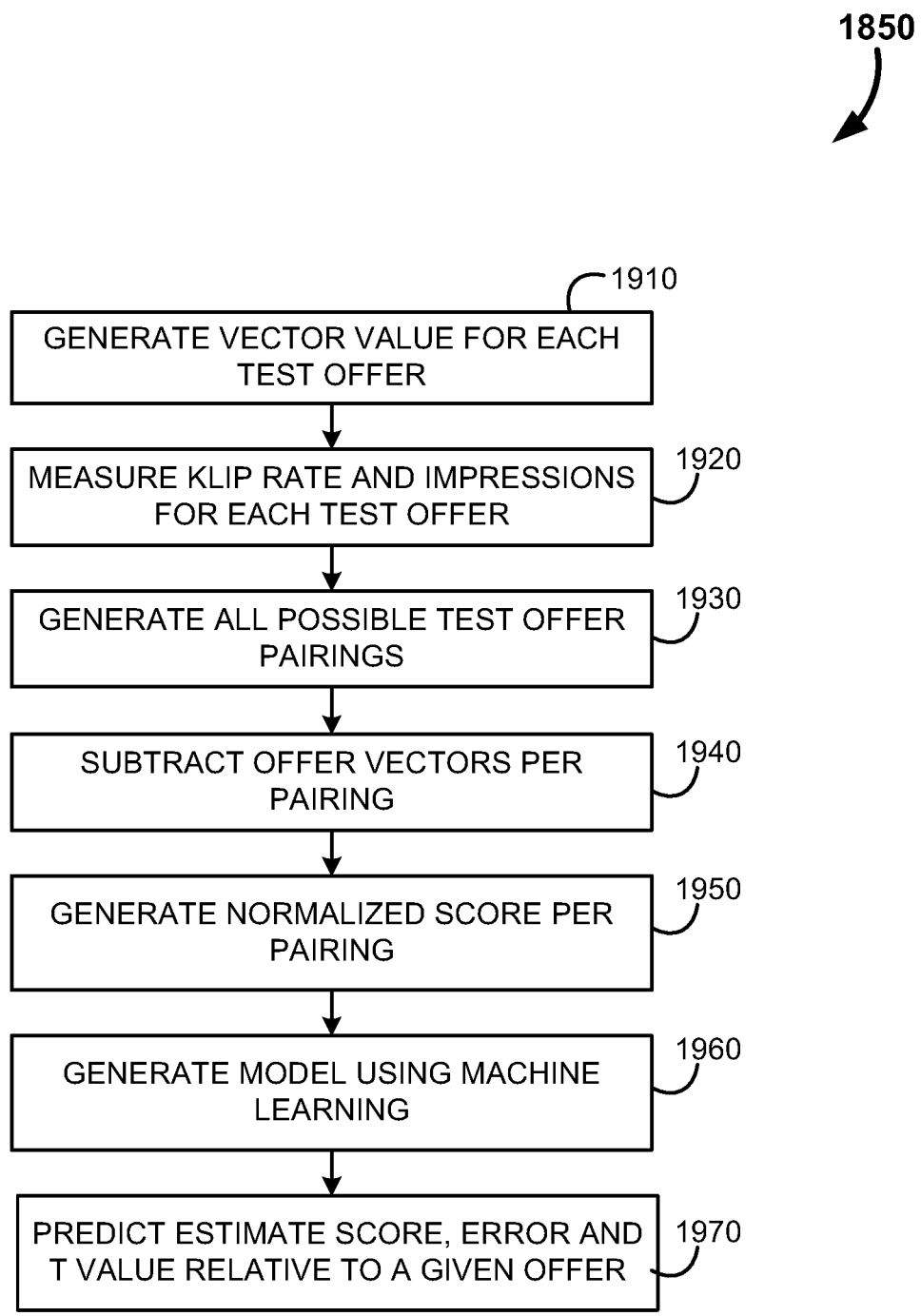
FIG. 19 shows, in accordance with some embodiments, a flowchart of an example method for the scoring of the selected top promotions.

This reduced set of possible offers is then subjected to scoring using machine learned models, at 1850, and are then subsequently ranked according to their scores. This scoring and ranking process is described in greater detail in relation to the process illustrated in FIG. 19. The scoring process starts with the feedback received from a set of test offers (also referred to as training offers). The variable values for each of these training offers are converted into a set of vectors, at 1910. As noted, the success of these training offers is also measured, at 1920, using klip rates, redemption rates, views, sharing, saving of the offers, impressions, or any weighted composite of these measures.

Next the training offers are paired in all possible combinations, at 1930, and the vector values for the two offers in the pair are subtracted from one another, at 1940, to generate differential vectors for each pair. A normalized score is then generated based upon these differential vectors, at 1950. The model is then generated utilizing machine learning, at 1960. For smaller scale datasets, the model may consist of a decision tree. For larger scale data sets, such as from multiple clients, a neural network model may be more appropriate.

After the model has been generated, linear regression may be utilized and applied to the offer set resulting from the application of heuristics, at 1970. This modeling results in an estimate and t-value, either of which may be employed to score the offer. Offers may then be ranked based upon their respective scores.

Returning to FIG. 18, after ranking the offers a set of the highest ranked offers are selected for inclusion in the promotional campaign, at 1860. The number of 'top offers' selected may be a predefined number, such as 4 or 5 offers, or may be a percentage of the total offer combinations (e.g., top 20% for example). The remaining offers (or some subset of the best ranking offers not selected as a 'top offer') may then be analyzed for inclusion in the promotional campaign, at 1870. As discussed above, orthogonality, as determined by minimizing the covariance/maximizing the determinant for a matrix of the variable values of the offers. Likewise, equal numbers of values for each variable is desired.

These top offers and selected remaining offers are then administered, at 1880, as a set of test promotions to sets of segmented consumers, as discussed extensively above. Feedback from these test offers is collected thereby allowing for further model refinement, at 1890, and ultimately for the generation of a general promotion for wider distribution once the modeling has been sufficiently validated.

III. System Embodiments

Figure 20A:
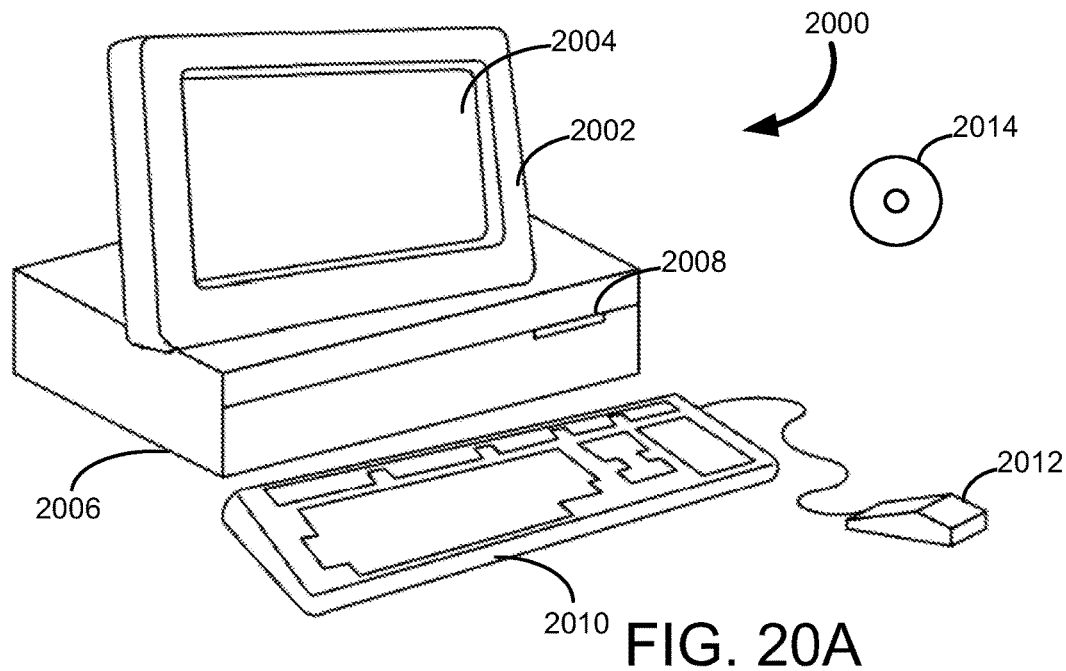
FIGS. 20A and 20B are example computer systems capable of implementing the system for design matrix generation and recommendation overlay.
Figure 20B:
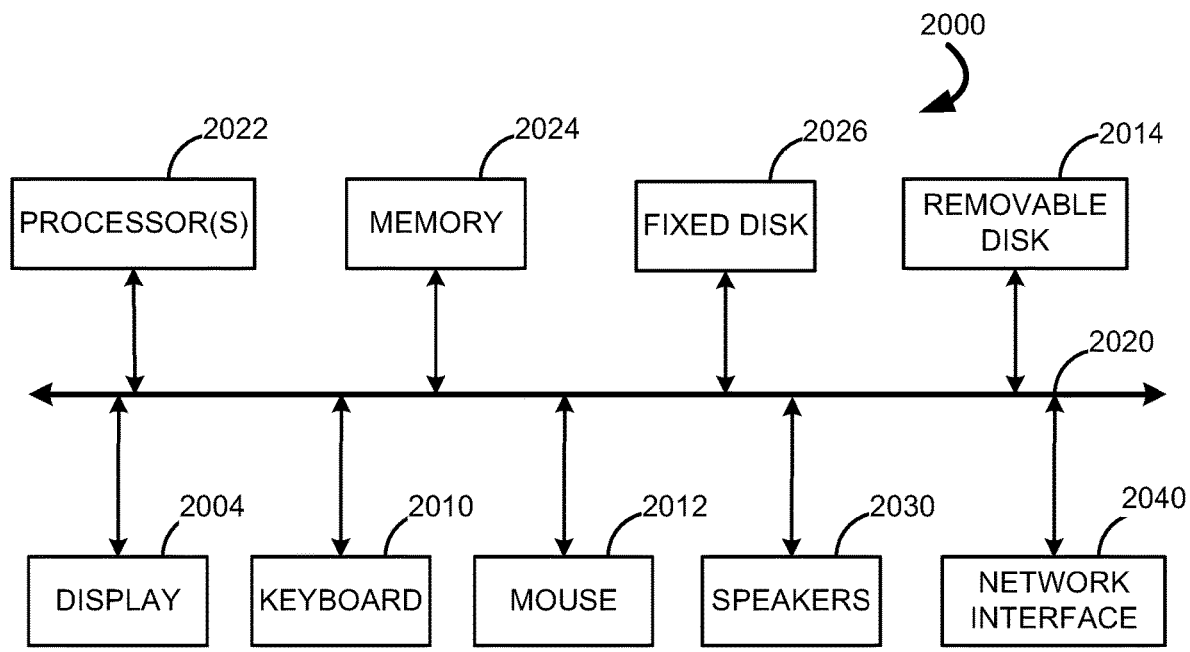

Now that the systems and methods for the generation of an intelligent promotional design systems and methods have been described, attention shall now be focused upon apparatuses capable of executing the above functions. To facilitate this discussion, FIGS. 20A and 20B illustrate a Computer System 2000, which is suitable for implementing embodiments of the present invention. FIG. 20A shows one possible physical form of the Computer System 2000. Of course, the Computer System 2000 may have many physical forms ranging from a printed circuit board, an integrated circuit, and a small handheld device up to a huge super computer. Computer system 2000 may include a Monitor 2002, a Display 2004, a Housing 2006, a Disk Drive 2008, a Keyboard 2010, and a Mouse 2012. Disk 2014 is a computer-readable medium used to transfer data to and from Computer System 2000.

FIG. 20B is an example of a block diagram for Computer System 2000. Attached to System Bus 2020 are a wide variety of subsystems. Processor(s) 2022 (also referred to as central processing units, or CPUs) are coupled to storage devices, including Memory 2024. Memory 2024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2026 may also be coupled bi-directionally to the Processor 2022; it provides additional data storage capacity and may also include any of the computer-readable media described below. Fixed Disk 2026 may be used to store programs, data, and the like and is typically a secondary storage medium (such as a hard disk) that is slower than primary storage. It will be appreciated that the information retained within Fixed Disk 2026 may, in appropriate cases, be incorporated in standard fashion as virtual memory in Memory 2024. Removable Disk 2014 may take the form of any of the computer-readable media described below.

Processor 2022 is also coupled to a variety of input/output devices, such as Display 2004, Keyboard 2010, Mouse 2012 and Speakers 2030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2022 optionally may be coupled to another computer or telecommunications network using Network Interface 2040. With such a Network Interface 2040, it is contemplated that the Processor 2022 might receive information from the network, or might output information to the network in the course of performing the above-described intelligent promotional design generation and administration. Furthermore, method embodiments of the present invention may execute solely upon Processor 2022 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for assessing value of an offer comprising:
   receiving a plurality of test offers, wherein each test offer comprises a plurality of variable values for a plurality of variables that correspond to a plurality of features of the test offer, wherein receiving the plurality of test offers comprises:
      defining values for each variable in the plurality of offers;
      generating a matrix of all variable value combinations; and
      applying heuristics to reduce variable value combination sets, wherein the reduced variable value combinations constitute the plurality of offers;
   converting the combination of variable values for each of the plurality of test offers into a vector;
   generating all possible test offer pairings based on the plurality of test offers;
   for each of the generated possible test offer pairings, subtracting a first offer vector for a first test offer of the pairing from a second offer vector for a second test offer of the pairing;
   generating normalized score per pairing based on, for each pairing, the subtraction of the first offer vector from the second offer vector of the pairing;
   predicting an estimated score for each test offer of the plurality of test offers based on the generated normalized scores, wherein predicting the estimated scores comprises:
      applying a neural network to the generated normalized scores;
   ranking the plurality of test offers based on the predicted estimated scores;
   selecting a configured number of offers with highest scores based on the ranking; and
   administering a subset of the plurality of test offers to a population of users.

2. The method of claim 1, wherein the predicting is performed by a machine learning model.

3. The method of claim 2, wherein the machine learning model is generated from the normalized score.

4. The method of claim 1, further comprising measuring klip rate and impressions for each of the plurality of test offers.

5. The method of claim 1, further comprising predicting an error and a T value for each predicted score.

6. The method of claim 1, further comprising selecting from the plurality of test offers not found in the selected offers with the highest scores a subset of other offers.

7. The method of claim 6, wherein the other offers are selected based on orthogonality of variable values to the selected offers with the highest scores.

8. The method of claim 7, further comprising testing the selected offers with the highest scores and the other offers to collect performance data.

9. A computer program product comprising a non-transitory computer-readable medium storing instructions that, when executed by a processor, cause the processor to perform the steps of:
   receiving a plurality of test offers, wherein each test offer comprises a plurality of variable values for a plurality of variables that correspond to a plurality of features of the test offer, wherein receiving the plurality of test offers comprises:
      defining values for each variable in the plurality of offers;
      generating a matrix of all variable value combinations; and
      applying heuristics to reduce variable value combination sets, wherein the reduced variable value combinations constitute the plurality of offers;
   converting the combination of variable values for each of the plurality of test offers into a vector;
   generating all possible test offer pairings based on the plurality of test offers;
   for each of the generated possible test offer pairings, subtracting a first offer vector for a first test offer of the pairing from a second offer vector for a second test offer of the pairing;
   generating normalized score per pairing based on, for each pairing, the subtraction of the first offer vector from the second offer vector of the pairing;
   predicting an estimated score for each test offer of the plurality of test offers based on the generated normalized scores, wherein predicting the estimated scores comprises:
      applying a neural network to the generated normalized scores;
   ranking the plurality of test offers based on the predicted estimated scores;
   selecting a configured number of offers with highest scores based on the ranking; and
   administering a subset of the plurality of test offers to a population of users.

10. The computer program product of claim 9, wherein the predicting is performed by a machine learning model.

11. The computer program product of claim 10, wherein the machine learning model is generated from the normalized score.

12. The computer program product of claim 9, wherein the instructions further comprise instructions that, when executed by a processor, causes the processor to perform the step of measuring klip rate and impressions for each of the plurality of test offers.

13. The computer program product of claim 9, wherein the instructions further comprise instructions that, when executed by a processor, causes the processor to perform the step of predicting an error and a T value for each predicted score.

14. The computer program product of claim 9, wherein the instructions further comprise instructions that, when executed by a processor, causes the processor to perform the step of selecting from the plurality of test offers not found in the selected offers with the highest scores a subset of other offers.

15. The computer program product of claim 14, wherein the other offers are selected based on orthogonality of variable values to the selected offers with the highest scores.

16. The computer program product of claim 15, wherein the instructions further comprise instructions that, when executed by a processor, causes the processor to perform the step of testing the selected offers with the highest scores and the other offers to collect performance data.

* * * * *